(12) United States Patent
Saraniecki et al.

(10) Patent No.: US 11,935,037 B2
(45) Date of Patent: Mar. 19, 2024

(54) METHOD AND APPARATUS FOR AUTOMATED COMMITTED SETTLEMENT OF DIGITAL ASSETS

(71) Applicant: Digital Asset (Switzerland) GmbH, Zurich (CH)

(72) Inventors: Walter Eric Saraniecki, New York, NY (US); Kelly Anne Mathieson, New York, NY (US); Ratko Goran Veprek, Zurich (CH); Johan Sjodin, Zurich (CH); Charng-Ching Yeh, New York, NY (US)

(73) Assignee: Digital Asset (Switzerland) GmbH (CH)

( * ) Notice: Subject to any disclaimer, the term of this patent is extended or adjusted under 35 U.S.C. 154(b) by 93 days.

(21) Appl. No.: 17/684,855

(22) Filed: Mar. 2, 2022

(65) Prior Publication Data

US 2022/0261791 A1    Aug. 18, 2022

Related U.S. Application Data

(62) Division of application No. 16/051,128, filed on Jul. 31, 2018, now Pat. No. 11,270,295.
(Continued)

(51) Int. Cl.
*G06Q 20/36* (2012.01)
*G06F 16/176* (2019.01)
(Continued)

(52) U.S. Cl.
CPC ..... *G06Q 20/3678* (2013.01); *G06F 16/1774* (2019.01); *G06F 16/182* (2019.01);
(Continued)

(58) Field of Classification Search
CPC .............. G06Q 20/00–425; H04L 9/00–38
See application file for complete search history.

(56) References Cited

U.S. PATENT DOCUMENTS

| 5,629,980 | A | 5/1997 | Stefik et al. |
| 5,892,900 | A | 4/1999 | Ginter et al. |

(Continued)

FOREIGN PATENT DOCUMENTS

| WO | 2017187394 A1 | 11/2017 |
| WO | 2017189027 A1 | 11/2017 |

(Continued)

OTHER PUBLICATIONS

Antonopoulos, "Mastering Bitcoin—Unlocking Digital Cryptocurrencies," In: "Mastering bitcoin: [unlocking digital cryptocurrencies]", Dec. 20, 2014, 298 Pages, O'Reilly Media, Beijing Cambridge Farnham Koln Sebastopol Tokyo, XP055306939.
(Continued)

*Primary Examiner* — John W Hayes
*Assistant Examiner* — Chenyuh Kuo
(74) *Attorney, Agent, or Firm* — Lerner David LLP

(57) ABSTRACT

The present disclosure relates to a system for locking a digital asset. In one implementation, the system may include a first computer node that reads a private data store associated with the first computer node and/or reads a distributed ledger to confirm a digital asset is unlocked and can be transferred from the first computer node. The first computer node cryptographically signs and sends a proposed digital lock to a second computer node. When activated, the digital lock prevents transfer of the digital asset from the first computer node to another computer node that is not the second computer node. The first computer node also reads a distributed ledger to confirm the distributed ledger contains the digital lock in an activated state. The first computer node
(Continued)

transfers the digital asset from the first computer node to the second computer node.

13 Claims, 31 Drawing Sheets

Related U.S. Application Data

(60) Provisional application No. 62/539,724, filed on Aug. 1, 2017.

(51) Int. Cl.
*G06F 16/182* (2019.01)
*G06Q 20/38* (2012.01)
*G06Q 20/40* (2012.01)
*H04L 9/06* (2006.01)
*H04L 9/32* (2006.01)
*H04L 9/00* (2022.01)

(52) U.S. Cl.
CPC ......... *G06Q 20/382* (2013.01); *G06Q 20/401* (2013.01); *H04L 9/0637* (2013.01); *H04L 9/3239* (2013.01); *H04L 9/3247* (2013.01); *H04L 9/3268* (2013.01); *H04L 9/50* (2022.05)

(56) References Cited

U.S. PATENT DOCUMENTS

| | | | |
|---|---|---|---|
| 6,343,738 | B1 | 2/2002 | Ogilvie |
| 7,143,290 | B1 | 11/2006 | Ginter et al. |
| 2004/0199471 | A1* | 10/2004 | Hardjono ............... G06F 21/10 705/50 |
| 2013/0041773 | A1 | 2/2013 | Muse |
| 2016/0092988 | A1* | 3/2016 | Letourneau .......... G06Q 20/363 705/66 |
| 2016/0292680 | A1 | 10/2016 | Wilson, Jr. et al. |
| 2016/0321751 | A1* | 11/2016 | Creighton, IV ....... G06Q 40/04 |
| 2016/0335609 | A1 | 11/2016 | Jenkins |
| 2017/0011460 | A1* | 1/2017 | Molinari ............... H04L 9/3247 |
| 2017/0116693 | A1 | 4/2017 | Rae et al. |
| 2017/0155515 | A1* | 6/2017 | Androulaki ............ H04L 9/006 |
| 2017/0308893 | A1 | 10/2017 | Saraniecki |
| 2017/0316391 | A1 | 11/2017 | Peikert et al. |
| 2019/0164138 | A1 | 5/2019 | Wright et al. |
| 2019/0295182 | A1 | 9/2019 | Kfir et al. |

FOREIGN PATENT DOCUMENTS

| | | |
|---|---|---|
| WO | 2018013124 A1 | 1/2018 |
| WO | 2018013934 A1 | 1/2018 |

OTHER PUBLICATIONS

Bruce Schneier, "Applied Cryptography", 1996, John Wiley & Sons, Inc., Second Edition (Year: 1996), 784 pages.
Extended European Search Report with Written Opinion for Application No. 18841129.2 dated Oct. 6, 2020, 7 pages.
International Preliminary Report on Patentabililty with Written Opinion for Application No. PCT/US2018/044682 dated Feb. 4, 2020, 7 pages.
International Search Report dated Nov. 16, 2018, issued in corresponding International Application No. PCT/US2018/044682; 3 pages.
Ron White, "How Computers Work", Oct. 2003, QUE, Seventh Edition (Year: 2003), 23 pages.
Tschorsch, et al. "Bitcoin and Beyond: A Technical Survey on Decentralized Digital Currencies," IEEE Communications Surveys & Tutorials, Mar. 2, 2016, pp. 2084-2123, vol. 18, No. 3, XP011620868.
Written Opinion dated Nov. 16, 2018, issued in corresponding International Application No. PCT/US2018/044682; 6 pages.

* cited by examiner

DAML Lock Proposal

Parameters:
- Giver
- Receiver(s)
- Security(ies)
- Amount(s)
- Lock until Date/Time
- Transfer time
- Transfer destination

DAML Lock Contract

Parameters:
- Giver
- Receiver(s)
- Security(ies)
- Amount(s)
- Lock until Date/Time
- Transfer time
- Transfer destination

Security

Parameters:
- Type
- Amount
- Owner
- Securities
- Intermediary
- Secured Party

Choices:

Fig. 21

```
template LockableAsset
    with
        owner: Party
        obligor: Party
        amount: Integer
        --further parameters describing the asset
        locked: Bool
        lockedUntil: Time
        lockContext: Text
    where
        signatory obligor
        controller owner can
            Transfer with newOwner: Party
                returning ContractId LockableAsset
                to do
                    assert (not locked)
                    create this with owner=newOwner
            --further choices relevant for Assets
            Lock with newLockContext: Text
                returning ContractId LockableAsset
                to do
                    assert (not locked)
                    create this with locked=True; lockContext=newLockContext
            Unlock with keyToken: ContractId TwoPartyKey
                returning ContractId LockableAsset
                to do
                    assert locked
                    keyR <- fetch keyToken
                    assert (keyR.owner == owner)
                    assert (keyR.obligor == obligor)
                    assert (keyR.lockContext == lockContext)
                    create this with locked=False; lockContext=""
            Clawback
                returning ContractId LockableAsset
                to do
                    t <- getTime
                    assert (t > lockedUntil)
                    create this with locked=False; lockContext=""
```

Fig. 22

METHOD AND APPARATUS FOR AUTOMATED COMMITTED SETTLEMENT OF DIGITAL ASSETS

CROSS-REFERENCE TO RELATED APPLICATIONS

The present application is a divisional of U.S. patent application Ser. No. 16/051,128 (now U.S. Pat. No. 11,270, 295), filed Jul. 31, 2018, which claims priority from U.S. Provisional Patent Application No. 62/539,724, filed on 1 Aug. 2017, the disclosures of which are incorporated herein by reference.

TECHNICAL FIELD

The present disclosure relates to the field of distributed ledgers. In some examples, the disclosure relates to a system and method for locking a digital asset between nodes using a distributed ledger.

BACKGROUND

In some current distributed ledger implementations, a node due to receive a token or digital asset may have an associated technical problem in that the node may bear a risk of non-performance of a node transferring the token or digital asset. In other words, the risk may be a risk that the node obligated to deliver such token or digital asset may, for whatever reason, fail to deliver such token or digital asset to a receiving node. Such failure may be due to a host of factors, ranging from unintentional (such as system or computer failures, electrical outages, communications disruptions, or human/operator error) to intentional (bankruptcy stays or a decision to renege on the delivery).

The associated technical problem may be exacerbated when the transfer of a token or digital asset occurs along a chain of nodes from a first node (the originator of the token) to a last node (ultimate designated receiver of the token). Each node, and the communication systems between each node, may become a potential point of failure. Moreover, each node in that chain bears the risk of non-performance by every other node in the chain. Any failure, whether a technical computer outage or an intentional halt to the transfer, at any node in the chain, may prevent the last node from receiving the token or digital asset.

SUMMARY

Embodiments of the present disclosure solve the above drawbacks to existing distributed ledgers in that it provides a distributed ledger implementation that prevents a failure, whether technical or human (intentional or unintentional) from disrupting the transfer of a token or digital asset to its ultimate designated receiver. By providing a technical solution including a locking mechanism on the distributed ledger, embodiments of the present disclosure may prevent the failure of any one or more nodes from disrupting a chain of transfers from the first node to the last node in the chain.

Throughout the present specification, the word "comprise", or variations such as "comprises" or "comprising", shall be understood to imply the inclusion of a stated element, integer or step, or group of elements, integers or steps, but not the exclusion of any other element, integer or step, or group of elements, integers or steps.

Any discussion of documents, acts, materials, devices, articles or the like, which has been included in the present specification is not to be taken as an admission that any or all of these matters form part of the prior art base or were common general knowledge in the field relevant to the present disclosure as it existed before the priority date of each of the appended claims.

Accordingly, embodiments of the present disclosure solve technical problems of extant distributed ledgers by utilising distributed ledger and smart contract technology to ensure that a digital asset is committed and locked to its designated receiver. In this way, if the integrity of a node is compromised, there is still a record of the commitment and lock of the digital asset on the distributed ledger.

In addition, in some embodiments, the lock of the digital asset is captured in a smart contract. Therefore, there is an associated technical advantage in that the lock may be activated (or deactivated) despite the status of a node in the chain.

There is provided a system for locking a digital asset comprising: a first computer node including a processor and memory, the first computer node configured to read a private data store associated with the first computer node and/or read a distributed ledger maintained by a network of computers, which includes the first computer node, to confirm a digital asset is unlocked and can be transferred from the first computer node to another computer node in the network; cryptographically sign and send a proposed digital lock including an inactive digital lock related to the digital asset to a second computer node, wherein when activated the digital lock prevents transfer of the digital asset from the first computer node to another computer node that is not the second computer node; read a distributed ledger to confirm the distributed ledger contains the digital lock in an activated state; and transfer the digital asset from the first computer node to the second computer node to settle a transaction between the first computer node and the second computer node.

In the system, to activate the inactive digital lock, the first computer node may be configured to validate the proposed digital lock against data stored in at least one data store to determine a validation result.

The validation result may be determined by one or more of validating the proposed digital lock against private data stored in a private data store of the first computer node; validating the proposed digital lock against data stored in a system data store associated with the system; or validating the proposed digital lock against data stored in the distributed ledger.

In the system, the second computer node may be configured to activate the inactive digital lock by validating the proposed digital lock against data stored in at least one data store to determine a second validation result.

In the system, the second validation result may be determined by one or more of: validating the proposed digital lock against private data stored in a private data store of the second computer node; validating the proposed digital lock against data stored in a system data store associated with the system;

or validating the proposed digital lock against data stored in the distributed ledger.

In the system, the first computer node may be further configured to store the proposed digital lock on a first private data store of the first computer node.

In the system, the second computer node may be further configured to store the proposed digital lock on a second private data store of the second computer node.

The first computer node may be further configured to store the activated digital lock on a first private data store of the first computer node.

There is also provided a non-transitory computer-readable medium comprising program instructions that, when executed, cause a first computer node to perform the method of: receiving a first proposed digital lock related to a digital asset recorded on a distributed ledger maintained by a network of computers, which includes the first computer node, the first proposed digital lock including a first inactive digital lock comprising program instructions that, when executed, prevent transferring ownership of the digital asset except for purposes of settling a transaction that transfers the digital asset from a first transferring computer node in the network to a second receiving computer node in the network; activating the first digital lock or receiving the first digital lock in an activated state; recording the first activated digital lock in the distributed ledger or transmitting the first activated digital lock for recordation in the distributed ledger; and reading the distributed ledger to confirm the distributed ledger contains the first activated digital lock.

The non-transitory computer-readable medium may further comprise program instructions that, when executed, cause the first computer node to store the first activated digital lock in a private data store not recorded to the distributed ledger.

In the non-transitory computer-readable medium, the reading step may comprise reading a first cryptographic representation of the first activated digital lock that is recorded in the distributed ledger.

The non-transitory computer-readable medium may further comprise program instructions that, when executed, cause the first computer node to generate a second cryptographic representation of the first activated digital lock, compare the first and second cryptographic representations of the first activated digital lock, and validate that the first and second cryptographic representations are equal.

The first and second cryptographic representations may each include a hash of the first activated digital lock.

In the non-transitory computer-readable medium, the receiving step may comprise receiving the first proposed digital lock by way of a secure, private messaging channel.

In the non-transitory computer-readable medium, the first proposed digital lock may further include program instructions that are executable by a deactivating computer node in the network that owns the digital asset, or another computer node in the network permissioned by the deactivating computer node. The program instructions when executed may act to deactivate the digital lock and permit transfer of the digital asset from the first transferring computer node to any other computer node in the network.

In the non-transitory computer-readable medium, the first computer node may cryptographically sign the proposed digital lock, thereby cryptographically authorizing execution of the program instructions described above.

In the non-transitory computer-readable medium, the deactivating computer node may be a second computer node in the network.

In the non-transitory computer-readable medium, the first transferring computer node may be a second computer node in the network, and the second receiving computer node may be the first computer node.

The non-transitory computer-readable medium may further comprise program instructions that, when executed, cause the first computer node to read the distributed ledger to confirm the first digital asset is unlocked and can be transferred from the first transferring computer node to another computer node in the network.

There is also provided a computer-implemented method comprising: reading a private data store associated with a first computer node and/or reading a distributed ledger maintained by a network of computers, which includes the first computer node, to confirm a first digital asset recorded on a distributed ledger is unlocked and can be transferred from a first transferring computer node in the network to a second receiving computer node in the network; by way of the first computer node, generating a first proposed digital lock related to the first digital asset, the first proposed digital lock including a first inactive digital lock comprising program instructions that, when executed, prevent transferring ownership of the first digital asset except for purposes of settling a transaction that transfers the first digital asset from the first transferring computer node to the second receiving computer node; sending the first proposed digital lock to a second computer node in the network; activating the first digital lock or receiving the first digital lock in an activated state; storing the first activated digital lock in the private data store and/or transmitting the first activated digital lock for recordation in the distributed ledger; validating, by way of the first computer node, that the first activated digital lock conforms to the first inactive digital lock included with the first proposed digital lock; and reading, by way of the first computer node, the distributed ledger to confirm the distributed ledger includes a cryptographic record of the first activated digital lock.

In the method, the cryptographic record of the first activated digital lock recorded in the distributed ledger may comprise a first hash of the first activated digital lock.

The method may further comprise, by way of the first computer node, generating a second hash of the first activated digital lock and comparing the first and second hashes to validate that the first and second hashes are equal.

In the method, the sending step may include cryptographically signing the proposed digital lock with a key stored on the first computer node.

In the method, the first proposed digital lock may further include program instructions that are executable by a deactivating computer node in the network that owns the digital asset, or another computer node in the network permissioned by the deactivating computer node. The program instructions, when executed, may act to deactivate the digital lock and permit transfer of the first digital asset from the first transferring computer node to any other computer node in the network.

In the method, the first computer node may cryptographically sign the first proposed digital lock, thereby cryptographically authorizing execution of the program instructions described above.

In the method, the deactivating computer node may be the first computer node.

In the method, the first transferring computer node may be the first computer node, and the second receiving computer node may be the second computer node.

In the method, the first computer node may activate the first digital lock.

In the method, the first computer node may receive the first digital lock in an activated state.

The method may further comprise receiving a second proposed digital lock related to a second digital asset recorded on the distributed ledger, the second proposed digital lock including an inactive digital lock comprising program instructions that, when executed, prevent transferring ownership of the second digital asset except for purposes of settling a transaction that transfers the second digital asset from a second transferring computer node in the network to a second receiving computer node in the network.

The method may further comprise activating the second digital lock or receiving the second digital lock in an activated state.

In the method, the second transferring computer node may be the second computer node.

In the method the second receiving computer node may be the first computer node.

The method may further comprise receiving a second proposed digital lock related to the first digital asset recorded on the distributed ledger, the second proposed digital lock including an inactive digital lock comprising program instructions that, when executed, prevent transferring ownership of the first digital asset except for purposes of settling a transaction that transfers the first digital asset from a second transferring computer node in the network to a second receiving computer node in the network.

In the method, the second transferring computer node may be a third computer node in the network, and the second receiving computer node may be the first computer node.

As used herein, the term "digital asset" includes, but is not limited to, a digital embodiment or representation of an established asset class, a native digital asset (e.g., Bitcoin, ETH, or any other cryptocurrency or digital token), or a digital representation of an obligation, contract, or explicit authorization.

BRIEF DESCRIPTION OF DRAWINGS

Examples of the present disclosure will be described with reference to the figures below:

FIG. 21 illustrates an example of parameters;

FIG. 22 illustrates an example of a lock contract composed in DAML;

DESCRIPTION OF EMBODIMENTS

Figure 1:
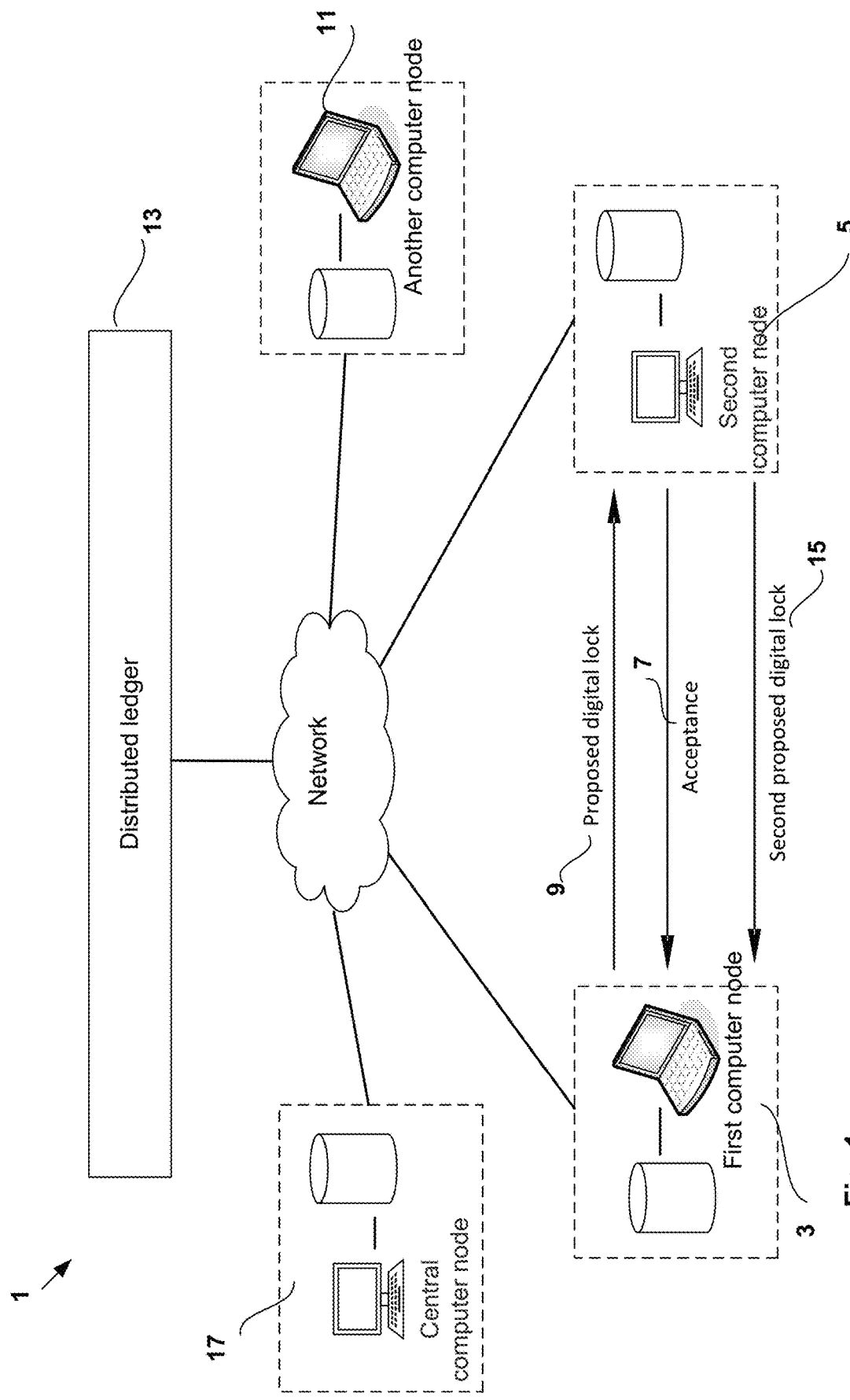
FIG. 1 illustrates an example system for locking a digital asset consistent with embodiments of the present disclosure.

The present disclosure relates to a distributed ledger implementation for committed settlement of digital assets, for example using digital locks associated with digital assets. Below, the disclosure first provides exemplary distributed ledger implementations that may be utilized with the aforementioned digital locks, and subsequently a process and apparatus for committed settlement of digital assets using such digital locks along with the distributed ledger implementations.

A distributed ledger is a record of transactions or other data, which exists across multiple distinct entities in a network. The ledger may be wholly replicated across participants, or segments may be partially replicated across a subset of participants. In either case, the integrity of the data is ensured in order to allow each entity to rely on its veracity and to know that data they are entitled to view is consistent with that viewed by others entitled to view the same data. This makes the distributed ledger a common, authoritative prime record—a single source of truth—to which multiple entities may refer and with which they may securely interact.

Distributed ledger technologies ("DLT") have expanded beyond mere transaction registries to include other forms of data and encoded business logic, sometimes referred to as "smart contracts". This means that not only does the technology synchronize the record of who owns what, but also provides an automated common workflow for processing that data, ensuring that the results of agreements are processed in the same, mutually agreed manner.

Several examples of DLT, which may be utilized with the presently-disclosed embodiments, are described below. The first example is an implementation that has a platform architecture, which includes a distributed ledger having a global synchronization log (GSL) and private contract store (PCS). The ledger may operate in conjunction with encoded business logic (e.g., smart contracts), e.g., with a modelling language referred to as the Digital Asset Modelling Language ("DAML"). Certain aspects of DAML are described in more detail in WO 2017/189027 and WO 2017/187394, while certain aspects of a distributed ledger as described above may be found in WO 2018/013124 and WO 2018/013934, the disclosures of which are hereby incorporated herein in their entireties. The second example is an alternative implementation of DLT that may be used with the presently-disclosed embodiments.

A. Distributed Ledger Architecture

A first example of a distributed ledger that may be used along with the presently-disclosed embodiments maintains confidentiality while allowing for the same data integrity assurances of typical blockchain solutions. This may be achieved by the parties involved physically segregating and storing locally confidential contractual information, and sharing a globally replicated log of only fingerprints, or "hashes", of sensitive data and execution commitments. These hashes are one-way cryptographic functions which may be proven to accurately match a party's data, but do not contain any information about the confidential data itself nor the parties involved.

Figure 24:
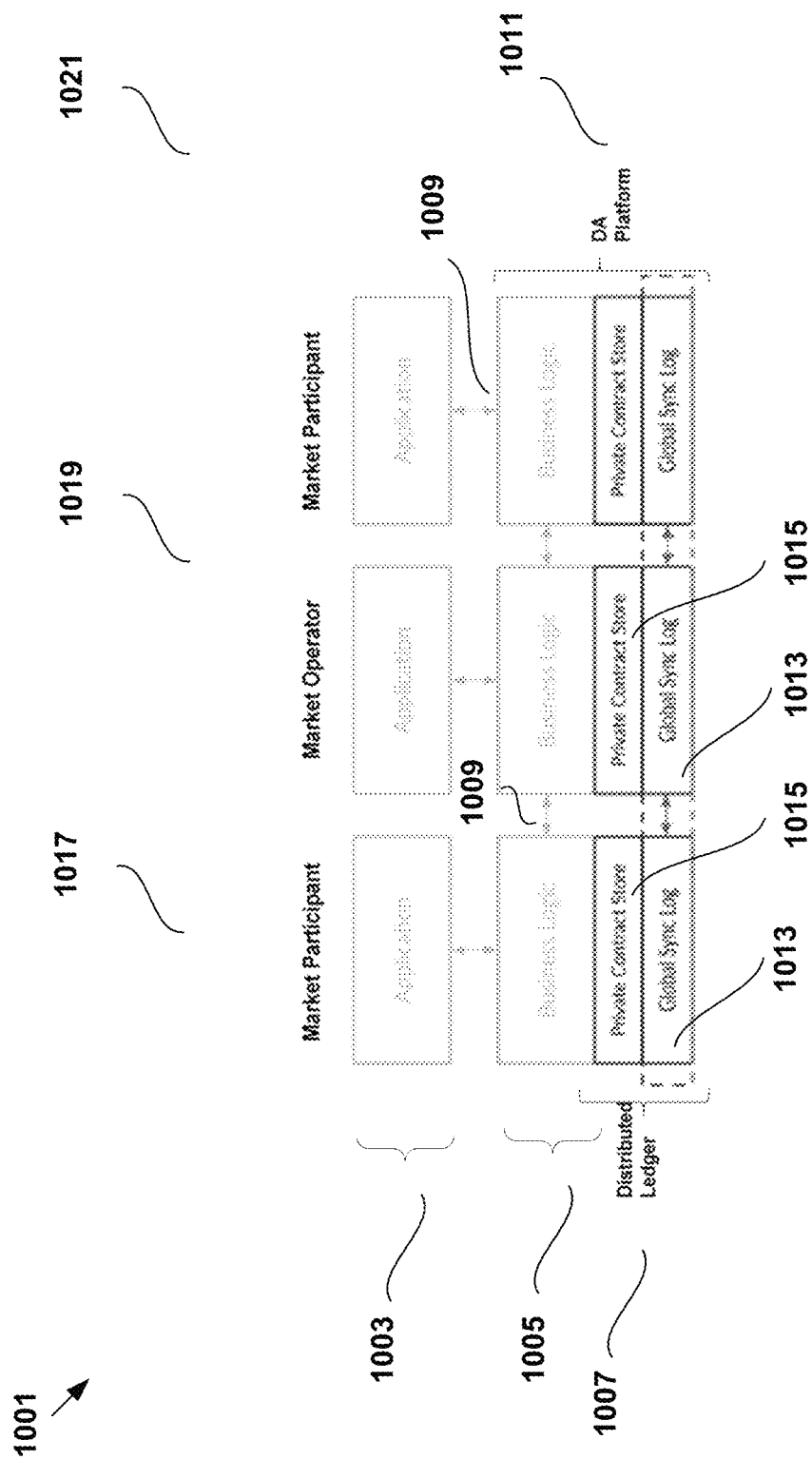
FIG. 24 illustrates a schematic of several nodes in a distributed computer network.
Figure 25:
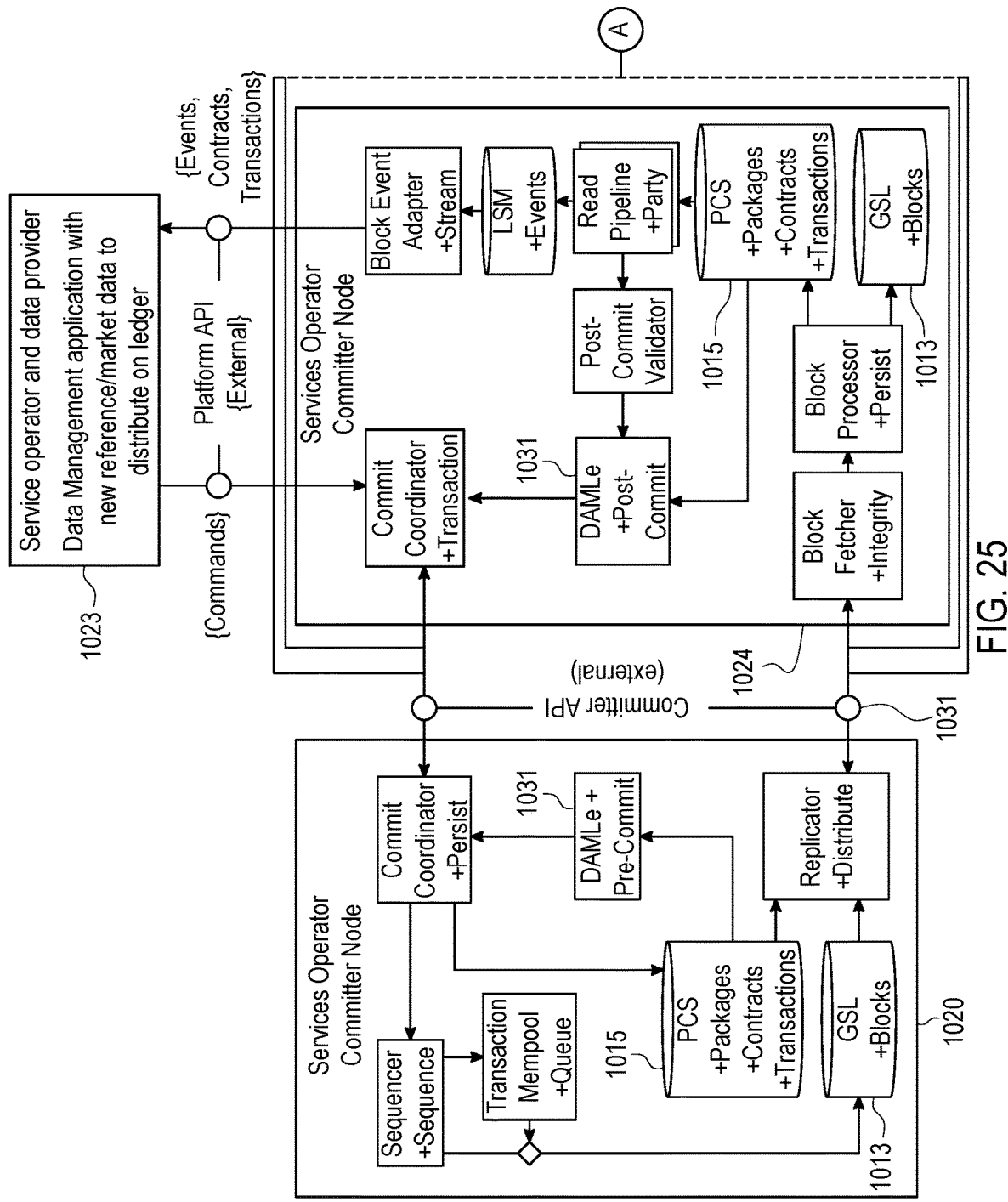
FIG. 25 illustrates a further schematic of the nodes in the distributed computer network of FIG. 24, with messaging, APIs, and additional internal node architecture illustrated in more detail.
Figure 25:
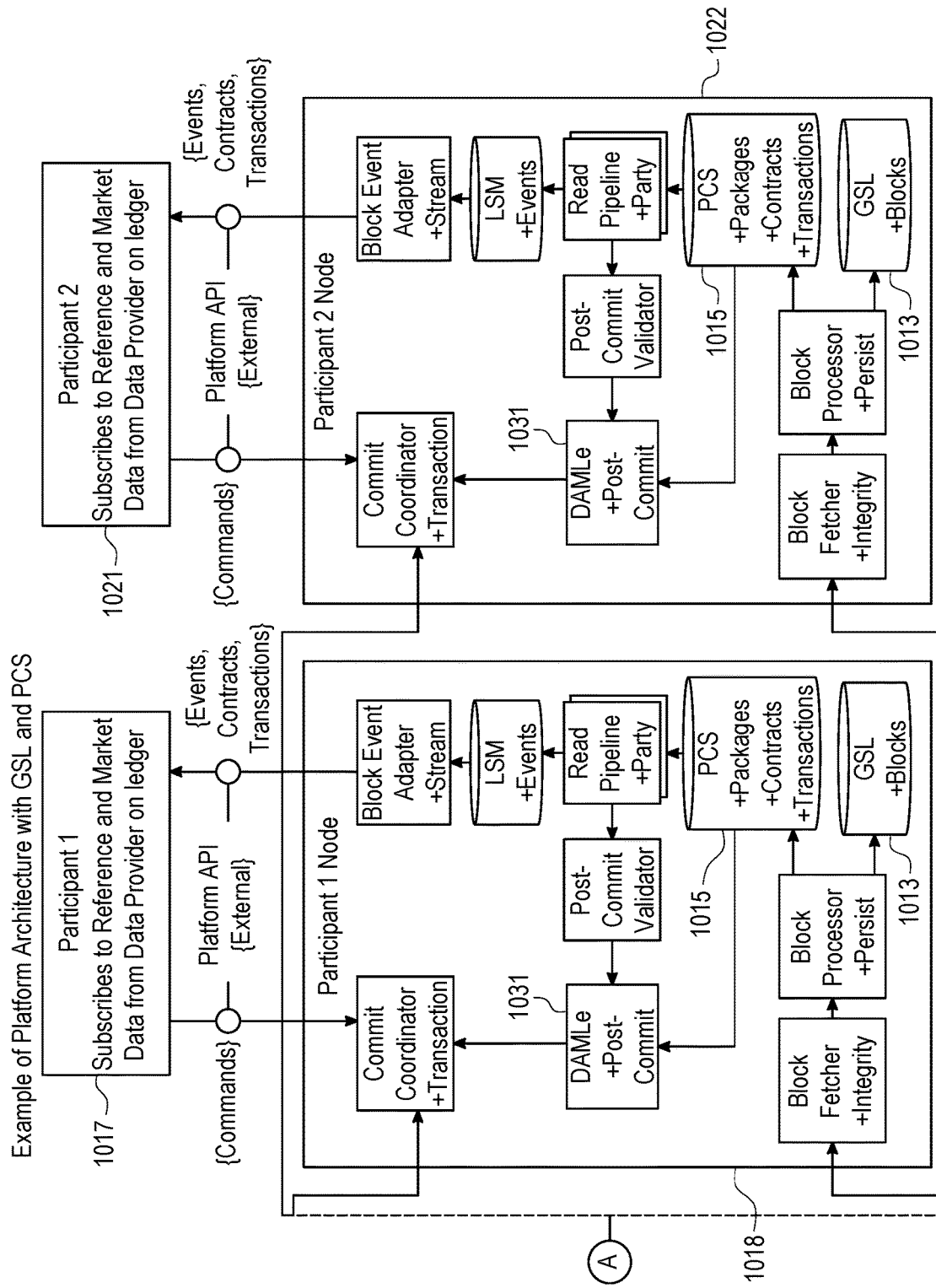
Figure 26:
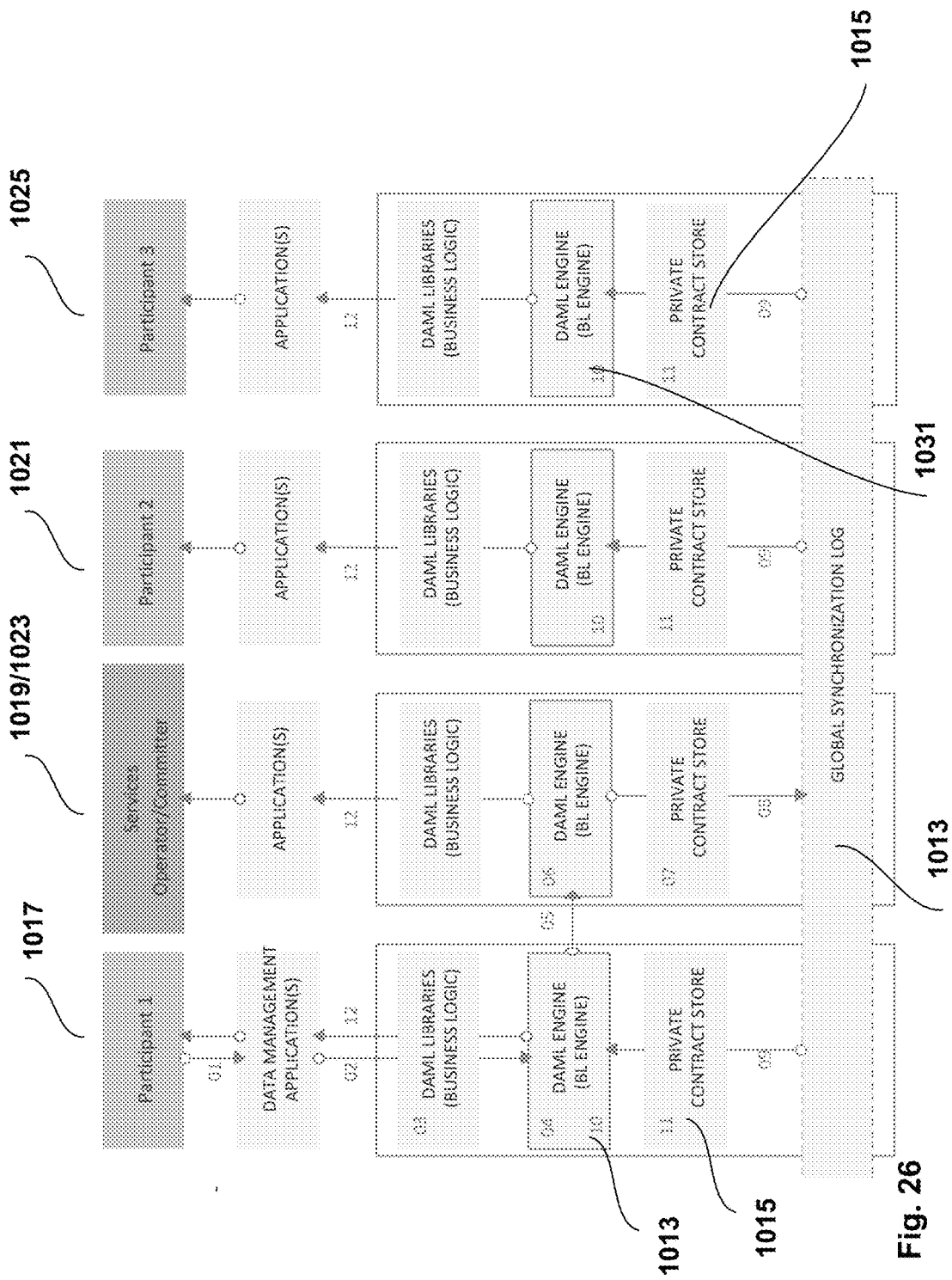
FIG. 26 illustrates an exemplary process for deploying or updating program instructions (e.g., a DAML contract) to a distributed ledger.

The distributed ledger may be implemented by way of a system 1001 as shown, for example, in FIGS. 25 and 26. The system 1001 may include multiple layers, such as an Application layer 1003, a Business Logic Layer 1005, and a distributed ledger 1007 layer as illustrated in FIG. 24. Each layer may have its own communication channels 1009. The distributed ledger 1007 may be a permissioned ledger, meaning it is a ledger accessible (for reading or for writing) only by known and pre-approved parties. This differs from a permissionless ledger, where anyone is permitted to read or write to the blockchain. The distributed ledger 1007 may include multiple subcomponents, including a Global Synchronization Log ("GSL") 1013 and a Private Contract Store ("PCS") 1015. The PCS 1015 can, for example, be a private data store that is segregated from the GSL 1013. As used herein, "segregated" means that data included in the PCS 1015 is not recorded in the GSL 1013, but rather is kept in a separate, private data store. As explained in more detail below, the use of a PCS 1015 may serve to enhance privacy of the distributed ledger for participants in the network.

(i) The Distributed Ledger 1007, GSL 1013 and PCS 1015

The system 1001 may maintain privacy for participants by concealing private data from other participants in the PCS 1015 while providing a GSL 1013 with public data which may be used to verify information and the integrity of information. Accordingly, the distributed ledger technology of FIG. 24 may provide technical improvements over extant distributed ledgers with regards to accuracy of the information stored thereon. Moreover, the distributed ledger technology of FIG. 24 may provide improved user experience over extant distributed ledgers with regards to privacy.

Unlike a network of segregated ledgers that lacks a global arbiter of truth where the system cannot guarantee network participants integrity of the complete set of relevant data, the present disclosure may utilize a GSL 1013, which may maintain confidentiality of the physically segregated ledgers (such as each party's individual PCS 1015) while also serving as a global arbiter of each PCS 1015.

For example, the GSL 1013 may be a shared and globally replicated log that allows for private data stored in one or more PCSs 1015 to be synchronized. Accordingly, the GSL 1013 may provide a mechanism by which PCSs 1015 may maintain accurate and up to date data. In some embodiments, the GSL 1013 does not cause an update of data stored in the PCS 1015 to occur (although it may in some examples). Instead, GSL 1013 may allow a PCS 1015 to be made to be consistent with the public data on the GSL 1013, as well as the private data of other participants (e.g., stored in another PCS 1015). For example, if a node (or participant in communication with a node) determines there is private data that needs to be updated, then the node may request such data. In some embodiments, synchronization does not mean that a PCS 1015 must store the same data as another PCS 1015 (such as that of another node), although such synchronization may occur. As used herein, "synchronization" includes any arrangement in which private data stored in the PCS 1015 is provably consistent with the public data in the GSL 1013 and that inconsistencies with the public data may serve as notice to the nodes and/or participants that private data should be updated.

Although system 1001 may be used for synchronization of any kinds of private data, in the context of the present disclosure it is generally used as a synchronized system for locking digital assets for settling transactions involving those digital assets. The details concerning locking of digital assets for purposes of committed settlement of transactions is discussed in more detail below.

(ii) Nodes and Participants in the System 1001

In the present disclosure, reference is made to a node in a number of contexts. As used herein, a "node" may refer to a computer or system that interacts with a computer and interfaces with the distributed ledger. Nodes may be operable in different modes including but not limited to: Reader Mode, Writer Mode and Auditor Mode. Each of these modes may give a different level of access to the GSL 1013 and associated PCS 1015 of the distributed ledger 1007.

As illustrated in FIG. 25, a node, e.g., nodes 1018, 1020, and 1024, may comprise, or be connected to, one or more participants, e.g., participants 1017, 1019, 1021, and 1023. There may be several types of participants in the system 1001.

A network participant, e.g., participant 1017, 1021, or 1023, may be a participant in the system that operates a node, e.g., node 1018, 1022, or 1024. A participant may be considered a direct participant when it has direct access to read or write to the GSL 1013. In the example of a financial market, market operators 1019, 1023 may operate nodes 1020, 1024 and may also be responsible for maintaining the rules of the market. Market operators 1019, 1023 may further govern access to the GSL 1013. This globally replicated log may be a permissioned ledger, meaning it is a ledger accessible (for reading or for writing) only by known and pre-approved nodes with associated participants.

Another type of participant may be an indirect participant. The indirect participants may not operate a node and therefore may connect to the network through interfaces operated by others. Indirect participants may delegate actions on the GSL 1013 to a third party who interacts with the GSL 1013 on their behalf.

Private data may be data that is private and confidential to a participant and, where the node associated with the participant, maintains privacy for the participant. Private data of a participant may be stored in confidence, with the authority of the participant, by other nodes. The private data may be stored in a respective PCS 1015 of a node to maintain the data's confidentiality.

Each network participant, e.g., participant 1017, 1021, or 1023, may have its own PCS, which contains all validated contracts to which the participant is a party. In this context, the term "contracts" refers to business logic, including transaction parameters, rights and obligations, reflecting the encoded terms of legal agreements by which participants are bound. Business logic may be composed using DAML, and thus may include program instructions that are representative of legal or other agreements between participants to the network. Accordingly, program instructions that may be executed by the node may be stored in the node's PCS 1015. The PCS 1015 may be stored locally and only contain those contractual agreements that the participant is entitled to store and view. The PCS 1015 may be a durable store of the codified contractual relations between parties. It may not process the executable business logic itself, which instead may be performed at the Business Logic Layer 1005. Therefore, the Business Logic Layer 1005 may execute the program instructions constituting the contractual relations between the parties rather than such execution happening in a node's PCS 1015. The PCS 1015 may contain a historical record of all executable contracts (both active and inactive) pertaining to a participant, but this segment of the distributed ledger, in some examples, cannot be constructed from the contents of the PCS 1015 alone. To construct the historical record, in certain examples, contracts stored within the PCS 1015 must be paired with corresponding active evidences stored in the GSL 1013.

When a node, e.g., node 1018, 1020, 1022, or 1024, is operable in a reader mode, referred to herein as a reader node, the reader node may become a network node that acts on behalf of participants that might be involved in some contracts or for supervising authorities. The reader node may monitor for notifications on behalf of its served participants on the GSL 1013, and may aggregate a partial database of private data. In some embodiments, some network participants only have reader mode permissions—for example participant 1017 and corresponding node 1018 may only read the GSL 1013 to verify private data.

When a node, e.g., node 1020 or 1024, is operable in a writer mode, referred to herein as a writer node, the writer node may record evidence into GSL 1013. The writer node may also guarantee the contradiction-less recording of evidence and, as a consequence, may have full access into private data that it records as public data. The role of the writer node may be shared by several nodes, such that a write to the GSL 1013 requires joint authorization, at least in certain scenarios. In some examples, this joint authorization may be arrived at using a consensus protocol, as detailed below. In other examples, a participant who is an operator (e.g., participant 1019 or 1023) may run a node (e.g., node 1020 or 1024) that is both a writer node and a reader node in order to be able to submit data on its own. Alternatively, a participant who is an operator may operate multiple separate nodes: one of which may be a writer node, the other of which may be a reader node.

A third mode is that of an "auditor" node. An auditor node may be a node authorized to run in auditor mode, which may have access to private data for the purposes of determining the integrity of at least part of the data in the system 1001. An auditor may have partial access to private data to ensure the integrity of the GSL 1013 is maintained. An auditor node may be associated with an auditor participant (such as an official auditor) who utilizes the auditor node to perform integrity checks on the data in the system. The "auditor" node may be associated with participants that have an interest in ensuring the integrity of the data such as a regulatory authority, market operator, or other authorized person.

(iii) DAML Contract and Data Propagation

The process of a node committing a DAML contract to the distributed ledger 1007, or updating data stored in a DAML contract or updating the DAML contract itself, is described below with reference to FIGS. 26 and 27. The process described below may be utilized to deploy initial DAML lock contracts, as described herein, and/or update data in DAML lock contracts or the DAML lock contract itself. Updating a DAML contract itself refers to deploying a new, updated version of the DAML contract to the network in place of a prior DAML contract that has been archived, as described herein.

When data is available, a node(s) of the respective participants 1017, 1019, 1021, 1023, 1025 may send a DAML Command via the Platform API of FIG. 25 to its DAML Execution Engine ("DAMLe") 1031, which is interpreted by DAMLe 1031 and translated into a transaction(s), as depicted in Steps 01-04 of FIG. 26. A DAML Command may constitute an API request (e.g., to the Platform API of FIG. 25) to execute certain DAML program instructions or code. In that sense, a DAML Command may constitute an API request that contains a data payload instructing a node(s) to execute certain DAML code and cause an update to the GSL 1013 and/or PCSs 1015 of affected parties. In some cases, this may take the form of updating data in a DAML contract, archiving and replacing a DAML contract with a new version of such contract, or more generally executing code in a DAML contract or series of related DAML contracts that causes state updates to occur to the ledger 1007. The DAMLe 1031 may constitute a runtime environment for execution of DAML code.

The DAML Command and the transaction(s) may be sent to a writer node(s) 1020, 1024, for instance using the committer API 1033 of FIG. 25, as depicted in Step 05 of FIG. 26. The transaction(s) may be a message to the writer node(s) 1020 to exercise a choice (e.g., execute a certain code segment) on a contract that has been previously deployed, which defines the rights and obligations of parties in the network. For instance, the message may be to execute a certain code segment in a DAML contract that modifies some data set forth in the DAML contract, executes a transaction (e.g., trade), deploys another DAML contract, or another function capable of being modelled in DAML. The message sent to the committer node(s) 1020 may contain an event that archives an original instance of the DAML contract, and creates a new instance of the DAML contract with new data, or creates an entirely different DAML contract or series of contracts representing the parties' agreement.

The writer node(s) 1020, 1024 may interpret the DAML command (as depicted in Step 06) to confirm that the transaction it received in Step 05 is valid. For instance, the writer node(s) 1024 may validate, by running the DAML Command received by the node(s) 1018, 1022 in its own DAMLe, among other things, that the message sender has the right to see the original DAML contract, the sender has a right to execute the relevant code segment that forms part of the DAML contract, any new transaction(s) signatories may be bound/placed into an obligable position, the DAML was correctly interpreted, and the most-recent version of DAML was used. The writer node(s) 1020 may also ensure the original DAML contract has not already been archived by a prior transaction, and determine who should be notified of the transaction, once it has been recorded to the distributed ledger 1007 (e.g., GSL 1013 and/or PCSs 1015 of relevant parties).

Figure 29:
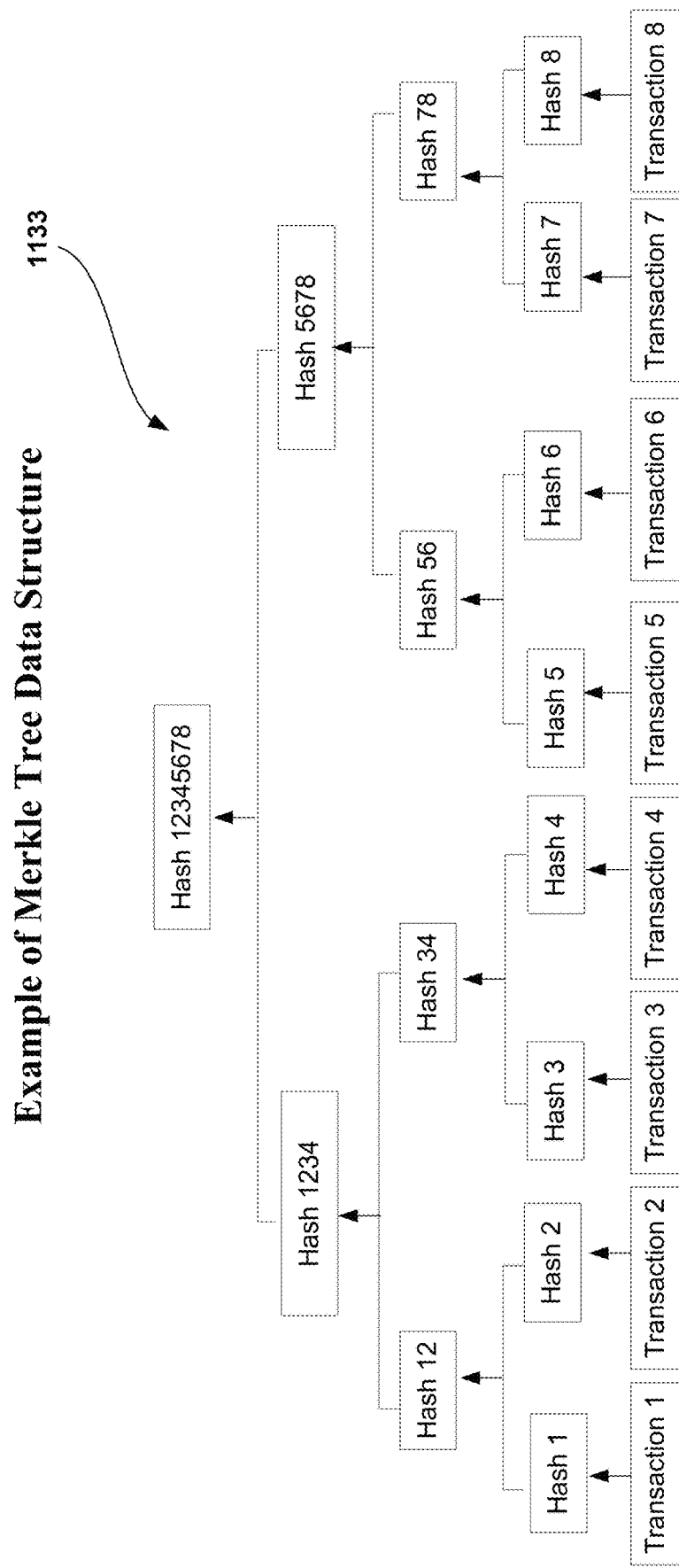
FIG. 29 illustrates an exemplary Merkle Tree data structure.

Once validation is complete, the writer node(s) 1020 may store the new DAML contract in its PCS 1015 (as depicted in Step 07 of FIG. 26) and add the aforementioned transaction to its transaction buffer (e.g., Transaction Mempool of FIG. 25) for eventual commitment to the GSL 1013. The transaction may be added to the Transaction Mempool along with other transactions, which ultimately may be combined in a block of the GSL 1013. As detailed above, the transaction may include a cryptographic representation (e.g., a hash) of events caused by execution of a code segment of a DAML contract. These events may include the creation of new DAML contracts or the archival of outdated contracts. The hash of the transaction may be combined with other transaction hashes, which may be hashed once more in a repeating cycle to form a Merkle tree (e.g., similar to the example shown in FIG. 29). Either the passage of a set amount of time or exceeding a maximum transaction limit in the Mempool may trigger the writer node(s) 1020 to produce a new block on the GSL and notify relevant participants. The new GSL block may contain a Merkle root (i.e., root of a Merkle hash tree, for instance as shown in FIG. 29) of all the transactions in the current Transaction Mempool, including the transaction created above. The block may also contain a sorted Merkle root of all notifications that must be sent to all relevant parties.

An event may be broadcast on the GSL 1013 (as depicted in Step 08 of FIG. 26) and a private notification, cryptographic proof and transaction details sent by the writer node(s) 1020 to appropriate Network Participant node(s) 1018, 1022 (as depicted in Step 09 of FIG. 26). Whether or not a participant/node in the network receives the aforementioned private notification (as depicted in Step 09 of FIG. 26) may depend on whether the participant/node is a stakeholder on the new DAML contract. A stakeholder may include (1) obligable parties (e.g., signatories/owners of the contract or parties being bound by the execution of a code segment of the DAML contract), (2) parties having rights (e.g., parties having an ability to execute a code segment of the DAML contract), and/or (3) parties having observer (e.g., read-only) privileges to the contract. If the participant/node is a stakeholder, it may receive the private notification described above. If not, the participant/node may simply receive the GSL block. The private notification may be a message sent, via a private, optionally encrypted secure channel (e.g., through the Replicator and Block Fetcher of FIG. 25), to stakeholders of a contract that provides:

1. The new GSL block,
2. An archival event of the original DAML contract,
3. The data of the newly created DAML contract,
4. Merkle proofs of the create and archive events, and/or
5. Merkle proofs of the notification of the create and archive events.

As shown in Steps 10-12 of FIG. 26, each stakeholder's DAMLe 1013 may validate the results (e.g., using a validation process described above in ¶ [0099]), store the new DAML contract in its PCS 1015, and send a DAML event to any connected applications and/or send a notification message to the stakeholder. The DAML event may be sent to any connected applications through an API so that the stakeholder or any of its applications listening for contract changes are notified of a change to the relevant DAML contract.

Using the above mechanism, only actual stakeholders to a DAML contract may be notified of a modification to the contract (e.g., any of the data therein, execution of a code segment in the DAML contract, etc.), and any resulting smart contract may be stored in the PCS 1015 of only stakeholders to the DAML contract. As such, using the private notification mechanism provided above, data pertaining to DAML contracts may be kept confidential in ledger 1007.

As detailed more fully below, the system 1001 and ledger 1007 may be utilized with DAML lock contracts (disclosed below) to affect transactions that provide for committed settlement of digital assets. The various DAML lock contracts may also be updated and kept confidential using the mechanisms described above.

B. Alternative Distributed Ledger Technology Platform

Although the example of a distributed ledger that may be used with DAML contracts (including DAML lock contracts) described above may be used in embodiments of the present disclosure, a different distributed ledger may be utilized with the present embodiments to affect committed settlement of digital assets utilizing a distributed ledger. An example of such an alternative distributed ledger is disclosed below.

Figure 27:
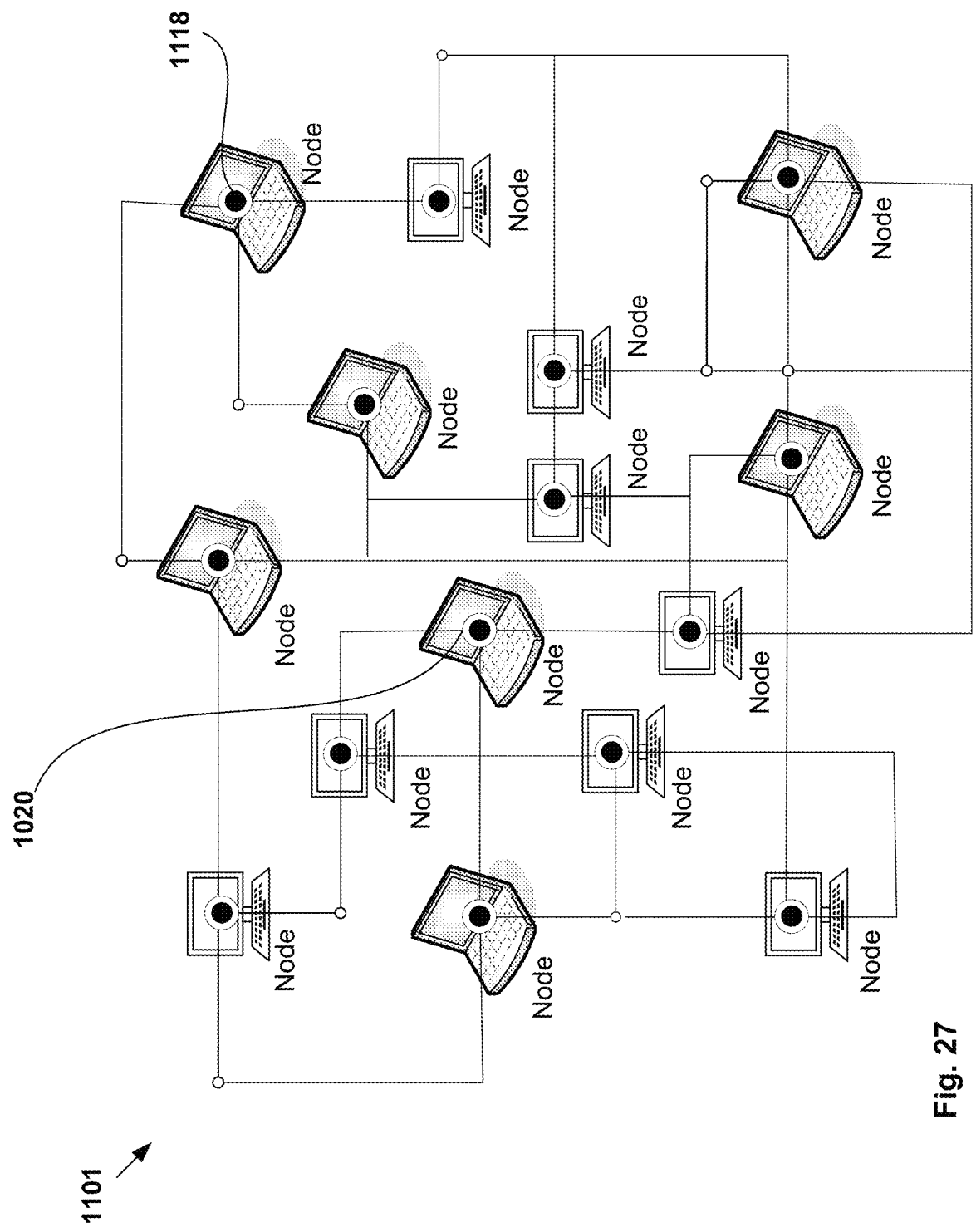
FIG. 27 illustrates an exemplary distributed ledger network with a plurality of nodes.
Figure 28:
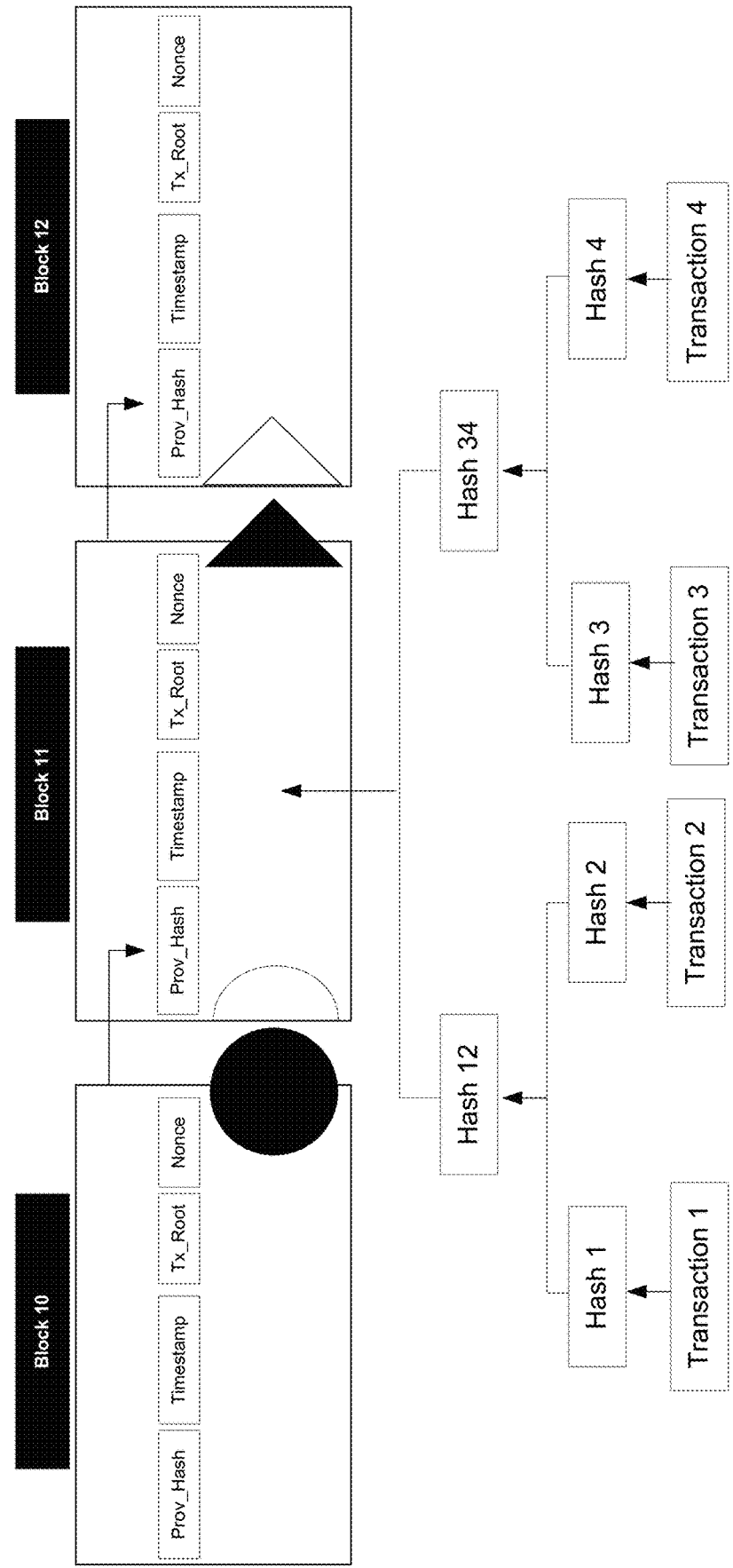
FIG. 28 illustrates a structure of a blockchain.

A DLT network 1101 that may be employed with the present embodiments may typically include a plurality of nodes, as shown in FIG. 27. The nodes may include "full" or "committer" nodes 1120, which are nodes capable of reading and writing transactions to the distributed ledger or blockchain 1107 (FIG. 28). The nodes may also include "participant" or read-only nodes 1118 that may read, but not write, to the distributed ledger 1107 or blockchain. In one example, the network of nodes may be permissioned to control which nodes have the ability to enter the network, in addition to which nodes are read-only or are read/write nodes. A permissioned network may include a network where the ability to run a node, whether read-only or read/write, is subject to approval/permission. A permissioned network may help to provide scalability (e.g., more transactions/sec), achieve privacy, and/or improve security of a distributed ledger, such as ledger 1107. In another example, the network of nodes may be permissionless or a hybrid permissioned/permissionless network. In a permissionless network, anyone has the ability to run a node, whether read-only or read/write, without requiring permission by some entity in partial or full control of the network.

For both permissioned, permissionless or hybrid networks, the network 1101 may utilize a consensus protocol. Examples of consensus protocols that may be used include byzantine-fault tolerant (BFT) consensus algorithms such as, for example, Paxos, Tendermint, Raft, or others, a Proof-of-Work (POW) consensus algorithm (e.g., as used in Bitcoin), a Proof-of-Stake (POS) algorithm, Practical Byzantine Fault Tolerant (PBFT) algorithms, and even other consensus algorithms. A consensus protocol may operate to keep all nodes on the network 1101 synchronized with each other, in terms of the state of the ledger or blockchain 1107. In other words, the consensus protocol may be a protocol where nodes come to an agreement on data that may be written to the ledger or blockchain 1107, so that all nodes in the network 1101 agree on the data—or state—comprising the ledger or blockchain 1107. In certain examples, a consensus protocol may use a peer-to-peer messaging protocol (e.g., over HTTP, RPC, or another messaging protocol) to transmit messages and data between nodes and arrive at consensus. As explained further below, where a consensus protocol is used, it may assist with determining what data should be written to the ledger by all nodes in the network.

A consensus protocol may also be utilized with the system 1001 and ledger 1007 detailed previously for the same purpose—e.g., to arrive at consensus as to updates to the state of the ledger 1007.

The network 1101 may also include a runtime environment/execution-engine (e.g., such as DAMLe described above, a virtual machine, etc.) that permits execution of program instructions or (e.g., a smart contract written in DAML) on the network 1101.

Figure 30:
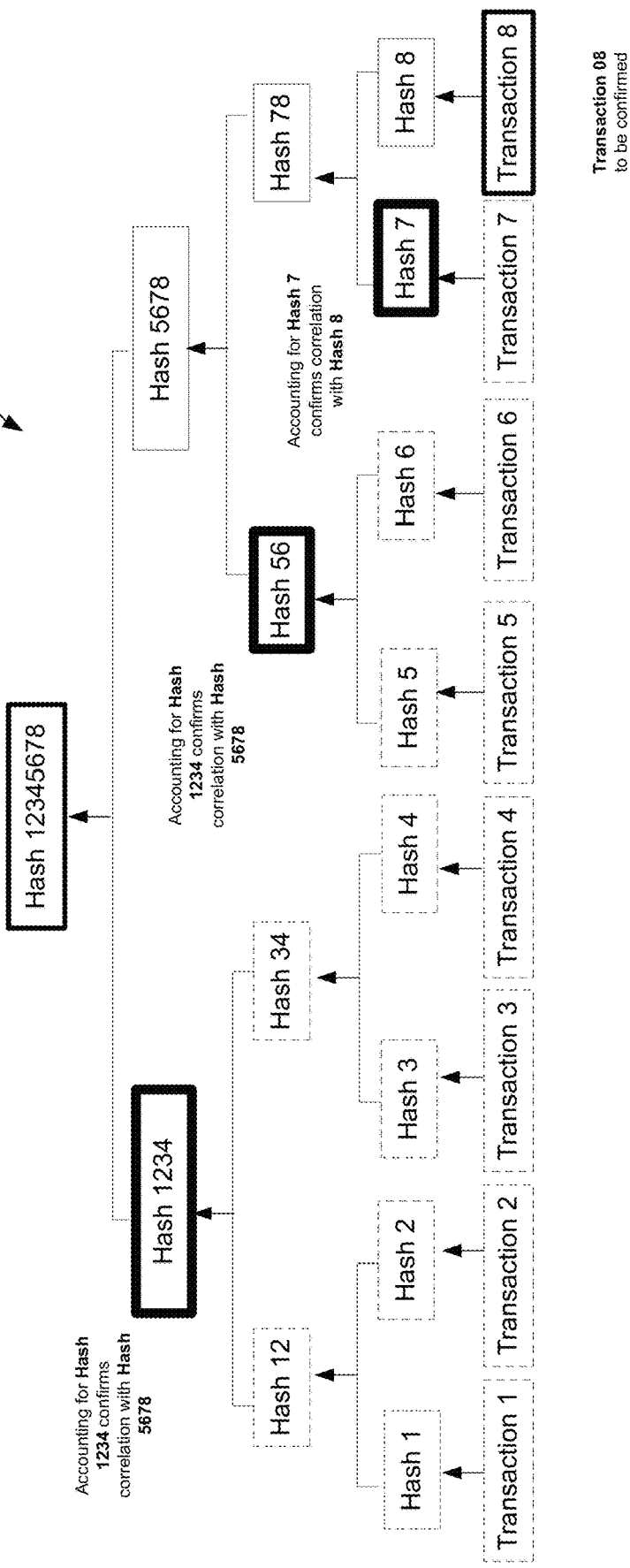
FIG. 30 illustrates an exemplary efficient lookup of data in a Merkle Tree.

In one example, the data structure of the ledger may be a blockchain 1107, as shown in FIG. 28. A blockchain 1107 may comprise a series of blocks that reference each other to form a "chain". As shown in FIG. 28, each block that is part of the chain references its prior block by a hash of the prior block (Prev_Hash), and the block may include a Timestamp, a Nonce, and a Tx_Root, which may be the root of a Merkle tree 1133 as shown in FIG. 29. In cryptography and computer science, a hash tree or Merkle tree 1133 is a tree in which every leaf node is labelled with the hash of a data block and every non-leaf node is labelled with the cryptographic hash of the labels of its child nodes. Hash trees generally allow for efficient and secure verification of the contents of large data structures. Merely as an example, a detailed Merkle tree is shown in FIG. 29, and an efficient lookup 1135 of data in a Merkle tree is shown in FIG. 30. Hash trees are a generalization of hash lists and hash chains.

Alternatively, the data structure of the ledger 1107 may constitute a distributed ledger with a different data structure.

An exemplary process of writing data to the ledger is now disclosed. It should be understood that the data-writing process may be used with, or interfaced with, DAML applications to update data in DAML contracts, submit transactions, or the like.

If a particular node has data to write to the ledger, in the form of an update to a DAML contract, executing a code segment of a DAML contract, deploying a new DAML contract, conducting a transaction in DAML, or the like, the node (e.g., node 1018 or 1022) may transmit the data to a read/write node for recording on the ledger 1007. Alternatively, if the node (e.g., node 1020 or 1024) is a read/write node, it may bypass the transmission to another node. In one example, the data may be cryptographically signed using a digital signature before it is transmitted to provide data integrity. Once received by the read/write node, the data (e.g., a "transaction") may be, in certain instances, hashed and combined with other hashed transactions in an efficient data structure, such as the Merkle tree of FIGS. 29 to 31. Incoming transactions/data may be assembled in a "transaction memory pool" of the read/write node and, in certain examples, logically ordered according to timestamp. In other cases, the transactions might not be ordered according to time. The transaction memory pool may be a buffer or another data-storage mechanism for pooling transaction data prior to recording such data to the ledger 1107.

If a blockchain data structure is used for the ledger, as shown in FIG. 28, the Merkle root (Tx_Root) may be supplied in a block along with a hash of the prior block (Prev_Hash), a block timestamp, and a nonce. A consensus algorithm may then be used by the read/write node to communicate peer-to-peer with other nodes participating in consensus to propose the block for entry into the ledger or blockchain 1107. For instance, the consensus algorithm might rely on a voting process amongst a set of nodes referred to as "validators". A block may be said to be committed by the network when a two-thirds (⅔) majority of validator nodes have cryptographically signed and broadcast commits for a particular block. When enough votes for a block are received, it may be committed to the ledger 1107 along with all the block's transactions. As one of ordinary skill will recognize, other consensus mechanisms (described above) may be used to determine whether to commit a block to the ledger 1107.

In a permissioned distributed ledger, particular nodes may be granted permission to commit blocks to the distributed ledger 1107.

In certain examples, privacy-preserving features may also be used with the distributed ledger or blockchain 1107. For instance, as in the system 1101 and ledger 1007 detailed above, data stores that are accessible only to a specific node (e.g., PCSs 1015) may be segregated/kept private from the public-facing portion of the distributed ledger or blockchain 1007 (e.g., GSL 1013) and/or other nodes. The public-facing portion of the distributed ledger or blockchain 1007 (e.g., GSL 1013) may then be used to ensure that the private data stores (e.g., PCSs 1015) of logically-related nodes (e.g., those who have engaged in a DAML contract) are consistent, with respect to DAML contracts that relate specifically to the parties.

Other privacy-preserving techniques may include encrypting data on-chain or in the ledger, such that the encrypted data is only readable by those with the required keys. Additionally or alternatively, advanced cryptographic techniques such as Zero-Knowledge Proofs (e.g., zkSNARKs, zkSTARKs, Buletproofs, etc.), ring signatures, or other mechanisms may be used to provide confidentiality to transactions as a whole or certain portions of transactions (e.g., a transaction amount).

Overview of a Committed Settlement System

An example of a system 1 for locking a digital asset associated with a transaction between a first node 3 and a second node 5 is illustrated in FIG. 1. The system 1 may comprise nodes 3, 5, 11 that include a processor and memory. Although not shown in FIG. 1, system 1 may include all the components, nodes, etc. of system 1001 and/or 1101 detailed previously.

First Proposed Digital Lock 9

The first node 3 in the system 1 may send a proposed digital lock 9 to the second node 5. The proposed digital lock 9 may relate to the transaction between, e.g., the nodes 3, 5, which may involve transferring a digital asset from the first node 3 to the second node 5. Along with or prior to sending, the first node 3 may store the proposed digital lock 9 in a private data store of the first node 3. The private data store may be the PCS of the first node 3, as described above. Likewise, the second node 5, upon receipt of the proposed digital lock 9, may also be configured to store the proposed digital lock 9 in a private data store of the second node 5. The private data store of the second node 5 may be the PCS of the second node 5. In an alternative example, the nodes 3 and/or 5 may not store the proposed digital lock 9 in a private data store and may instead use other privacy-preserving mechanisms detailed herein to keep the details of the proposed digital lock 9 private to the nodes.

In one example, the first node 3 may read a private data store associated with the first computer node 3 to confirm a digital asset is unlocked and can be transferred from the first computer node 3 to another computer node in the network. The private data store associated with the first computer node 3 may be the PCS of the first node 3. In another example the first node 3 may read the distributed ledger to confirm the digital asset is unlocked.

In one example, the first node 3 may cryptographically sign (e.g., using a private key, digital signature, etc.) the proposed digital lock 9 sent to the second node 5 so that the second node 5 may confirm the authenticity of the proposed digital lock 9. Cryptographically signing a proposed digital lock 9 may comprise creating and applying a digital signature to a message containing the proposed digital lock 9 by way of a private key associated with the first node 3. Cryptographically signing the proposed digital lock 9 may permit the second node 5 to verify that the proposed digital lock 9 came from the first node 3 to the transaction.

The proposed digital lock 9 can, in one example, comprise program instructions or code (e.g., in DAML as shown in FIG. 22) that, when executed, commits the first and second nodes 3, 5 to a transaction involving a digital asset recorded to a distributed ledger 13. The distributed ledger 13 may be either of distributed ledgers 1007 or 1107 detailed above in the context of systems 1001 and 1101, respectively. In one example, the proposed digital lock 9 may include an inactive digital lock related to the digital asset, wherein when activated the digital lock may prevent transfer of the digital asset from the first node 3 to another node 11 that is not the second node 5. In this way, the digital lock may prevent transfer of the digital asset except to settle the transaction between the first and second nodes 3 and 5.

The first node 3 of the system 1 may also be configured to receive acceptance 7 of the proposed digital lock 9 from the second node 5. In one example, after the first node 3 receives the acceptance 7, the first node 3 may activate the inactive digital lock to prevent transfer of the digital asset except to settle the transaction between the nodes 3 and 5. The acceptance 7 may comprise a notification or token that is sent from the second node 5 to the first node 3. In some examples, the acceptance 7 may provide an indication that parameters of the proposed digital lock 9 are accepted for the transaction by the second node 5. The second node 5 may cryptographically sign the acceptance 7, in some embodiments.

Additionally or alternatively, the acceptance 7 may take the form of the second node 5 simply activating the digital lock that is part of the proposed digital lock 9 and messaging the first node 3 as to its acceptance 7 of the proposed digital lock 9, either privately and/or by recording its acceptance 7 to the distributed ledger 13, 1007, 1107. Activating the digital lock that is part of the proposed digital lock 9 may constitute the first 3 or second node 5 executing program instructions (e.g., a code segment) that acts to: (i) submit a transaction that is recorded to the distributed ledger (e.g., ledger 13, 1007, or 1107) to update the state of the ledger and reflect that the digital asset is locked except for purposes of settling the digital asset transfer from the first node 3 to the second node 5, and/or (ii) deploy additional program instructions or code that specifies the details of the digital asset transfer (e.g., the particular digital asset, quantity, price, parties to the transfer, etc.) and includes a code segment(s) executable by the first node 3 or the second node 5 that transfers the digital asset from the first node 3 to the second node 5 according to the details of the agreed-upon transfer. The instructions of (ii), or a cryptographic representation (e.g., a hash) thereof, may be recorded to the distributed ledger (e.g., ledger 13, 1007, or 1107) as a transaction or series of transactions, in certain cases.

In embodiments where the first node 3 activates the digital lock, the code segment(s) of (ii) that transfers the digital asset may, in one example, require a cryptographic signature (e.g., private key, digital signature, etc.) by the first node 3 to be executed. Likewise, in embodiments where the second node 5 activates the digital lock, the code segment(s) of (ii) that transfers the digital asset may, in one example, require a cryptographic signature (e.g., private key, digital signature, etc.) by the second node 5 to be executed. For example, the first node 3 may send a proposed digital lock 9 that includes a code segment that is executable by the second node 5 upon providing its cryptographic signature and, when executed, acts to lock the digital asset that is the subject of the transaction for purposes of settling the transaction. By sending the proposed digital lock 9 with the code segment executable by the second node 5, the first node 3 may be considered to have implicitly agreed to activation of the digital lock according to the terms set forth in the proposed digital lock 9. Thus, the second node 5 may be free to activate the digital lock that is part of the proposed digital lock 9 by executing the activation code segment provided by the first node 3 in the proposed digital lock 9.

In one example, validating that a node is properly permitted to execute a particular code segment may be enforced using digital signatures and/or public/private keypairs associated with a node. For instance, in the above example, execution of the code segment by the second node 5 that activates the digital lock may be enforced using a public/private keypair associated with the second node 5. To demonstrate that the second node 5 is permitted to execute the code segment activating the digital lock that is part of the proposed digital lock 9, the second node 5 may cryptographically sign (e.g., using its private key, a digital signature, etc.) to confirm it is a node permitted to execute the code segment. Likewise, determining whether any node is properly permitted to execute a code segment described herein may use the same mechanism (i.e., require a cryptographic signature by such node for execution of the code segment). Accordingly, embodiments of the present disclosure may use a technical solution including cryptographic signatures to avoid trust problems that arise with conventional intermediaries.

After activation of the digital lock, the first node 3, second node 5 or another node 11 may broadcast the activated digital lock for recordation in the distributed ledger 13, 1007, 1107. As described previously, the distributed ledger may comprise a GSL 1013 shared between nodes of the system 1001, and separate PCSs 1015 of the first and second nodes 3 and 5 that are participants to the transaction including the digital asset. The first node 3 and/or second node 5 may also read the distributed ledger (e.g., ledger 13, 1007, or 1107) to confirm the distributed ledger contains the digital lock in an activated state. In some examples, the first node 3 may transmit data to a central node 17 (e.g., a central writer or "committer" node) for recordation in the distributed ledger (e.g., ledger 13, 1007, or 1107). Accordingly, the central node 17 may act as a writer node as described above to record evidence of the activated digital lock to the GSL 1013. Additionally or alternatively, the first node 3 may broadcast the activated digital lock for recordation in the distributed ledger (e.g., ledger 13, 1007, or 1107). Accordingly, the first node 3 may act in writer mode so that evidence of the activated digital lock is recorded in the GSL 1013 of the distributed ledger. In some examples, evidence of the activated digital lock may comprise a cryptographic representation of the activated digital lock, such as a hash, recorded in the GSL 1013.

With the activated digital lock recorded to the distributed ledger (e.g., ledger 13, 1007, or 1107), all participants to the transaction, such as the first and second nodes 3 and 5, may confirm that the digital asset that is subject to the transaction is locked for purposes of the specific transaction and that transaction only. Further, the distributed ledger may serve as the prime source of truth between the parties that the digital asset is locked for purposes of their transaction and that transaction only.

At some set time, the first node 3 or second node 5 may transfer the digital asset from the first node 3 to the second node 5 to settle the transaction between the first and second nodes 3 and 5. In practice, either node 3 or 5 may transfer the digital asset in accordance with the transaction and be permitted to execute program instructions (e.g., a DAML code segment) that transfers the digital asset from the first node 3 to the second node 5 for purposes of settling the transaction. As previously mentioned, such DAML code segment, or a cryptographic representation (e.g., a hash) thereof, can be recorded to the ledger (e.g., ledger 13, 1007, or 1107) in advance of execution of the segment to ensure that proper evidence is in the ledger as to the content of the code segment and which node(s) is authorized to execute the segment. Subsequently, the node (e.g., node 3 or 5) that executes the program instructions (e.g., code segment) transferring the digital asset may record an update to the distributed ledger (e.g., ledger 13, 1007, or 1107) that lists the second node 5 as the owner of the digital asset. Alternatively, the node (e.g., node 3 or 5) that executes the transfer code segment may delegate recording to the distributed ledger to another node (e.g., a write node).

The first node 3, second node 5, or another node 11, may deactivate the digital lock related to the digital asset along with or subsequent to settlement of the transaction transferring the digital asset from the first node 3 to the second node 5. In some examples, deactivating the digital lock related to the digital asset may comprise executing program instructions (e.g., a DAML code segment) that updates the distributed ledger (e.g., ledger 13, 1007, or 1107) as part of a transaction or series of transactions to reflect that the digital asset may be transferred by the second node 5 to any other node in the network (e.g., network 1001 or 1101) without restriction. For example, this may include recording a code segment (e.g., a DAML code segment) and/or a cryptographic representation (e.g., a hash) thereof, to the distributed ledger (e.g., ledger 13, 1007, or 1107) that is executable by the second node 5 (e.g., upon providing its cryptographic signature) and, when executed, transfers the digital asset from the second node 5 to another node in the network without restriction.

Additionally or alternatively, deactivating the digital lock may comprise sending a token of deactivation to the first node 3 or the central node 17. The first node 3 or the central node 17 may then update the ledger (e.g., ledger 13, 1007, or 1107) to deactivate the digital lock. Additionally or alternatively, the second node 5 or another node 11 may deactivate the digital lock provided that the transaction between the nodes 3 and 5, has settled or was otherwise terminated by the nodes 3 and 5 upon mutual agreement.

In another example, the proposed digital lock 9 may comprise program instructions that cancel the digital lock when certain conditions are met. Accordingly, the proposed digital lock 9 (and by extension the activated digital lock) may be configured so that the receiving participant of the digital asset, such as the second node 5, has an ability to, alone and/or jointly with another node(s), execute a certain code segment forming part of the activated digital lock. The code segment, for example, may be program instructions that reflect an option to purchase the digital asset over some set period of time. In one example, the activated digital lock may persist and remain until the relevant code segment (e.g., option purchase) is executed by the second node 5, or the set period of time expires. If the relevant code segment is not executed during the period in which it is executable, as detailed above (e.g., the option purchase period), a separate code segment executable by the first node 3 may be executed (e.g., upon providing its cryptographic signature) to deactivate the digital lock. In another example, the proposed digital lock 9, and by extension the activated digital lock, may comprise program instructions that automatically deactivate the digital lock after some set period of time and record such deactivation to the distributed ledger (e.g., ledger 13, 1007, or 1107).

Additionally or alternatively, the proposed digital lock 9 may comprise one or more of: data related to at least one of the first node 3, second node 5 or another node 11; data related to the digital asset; data related to terms of the acceptance 7 of the proposed digital lock 9; or data related to deactivation of the digital lock. The proposed digital lock 9 may also include any of the parameters as illustrated in FIG. 21.

Second Proposed Digital Lock 15

In some embodiments, the transaction of the system 1 may further comprise a second proposed digital lock 15 for a second digital asset associated with the second node 5. The second proposed digital lock 15 may include a second inactive digital lock, which, when activated, may prevent transfer of the second digital asset from the second node 5 to another node 11 that is not the first node 3 for purposes of settling the transaction. In one example, the transaction between the first and second nodes 3 and 5 may be a transaction that exchanges the first, locked digital asset for the second, locked digital asset. When the transaction is settled that transfers the first digital asset from the first node 3 to the second node 5, and transfers the second digital asset from the second node 5 to the first node 3 as part of the exchange of the first digital asset for the second digital asset, any activated digital locks on the first and second digital assets may be deactivated as discussed previously. Accordingly, the second proposed digital lock 15, and any activation or deactivation of any associated digital lock, may be performed as disclosed herein for the proposed digital lock 9 and its associated lock.

Used together, the first and second proposed digital locks 9 and 15, and any associated activated digital asset locks, may commit the first and second nodes 3 and 5, to settle a transaction involving the first and second digital assets where both parties can be assured that the first and second nodes 3 and 5 will deliver on settlement. This may ameliorate any risk of non-performance, which may be present in conventional systems.

Method of Locking a Digital Asset 200

Figure 2:
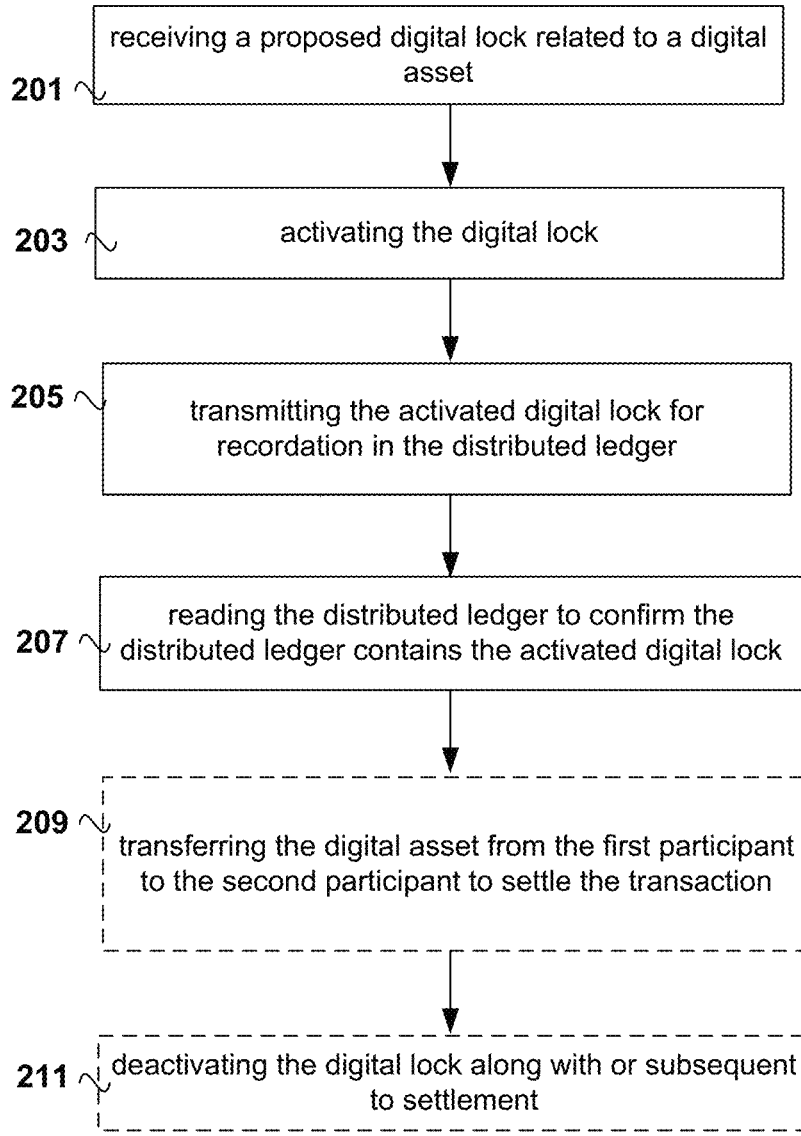
FIG. 2 illustrates an exemplary method for locking a digital asset as performed by a computer-readable medium consistent with embodiments of the present disclosure.

Embodiments of the present disclosure further include a non-transitory, tangible computer readable medium comprising program instructions that, when executed, cause a computer to perform the method 200 as illustrated in FIG. 2. The method is described above, but is recited here to illustrate more broadly an example of the overall process.

The method 200 may comprise receiving 201 a proposed digital lock 9 related to a digital asset recorded on a distributed ledger (e.g., ledger 13, 1007, or 1107) maintained by a network of computers. The distributed ledger may be the GSL 1013, as described above. The network of computers may comprise a combination of reader, writer and audit nodes, as described above. In some examples, the first node 3 or second node 5 may receive the proposed digital lock 9. In one example, the first node 3 may send the proposed digital lock 9 to the computer node 5. In this example, the first node 3 may cryptographically sign the proposed digital lock with a key stored on the first node 3. Another node 11 may also receive the proposed digital lock 9. Receiving the proposed digital lock 9 may comprise receiving the proposed digital lock 9 using a secure, private messaging channel between the first and second nodes 3 and 5.

In other examples the proposed digital lock 9 may be generated by the first computer node 3. The proposed digital lock 9 may then be sent to a second computer node 5 in the network.

The proposed digital lock 9 may include an inactive digital lock comprising program instructions that, when executed, prevent transferring ownership of the digital asset except for purposes of settling a transaction that transfers the digital asset from a first participant in the network to a second participant. Each participant may be associated with a node or computer of the network. The digital lock may be configured for activation by the first participant to the transaction. Accordingly, the digital lock may be activated by the first node 3, second node 5 or another node 11. In other examples the digital lock may be received in an activated state.

The method 200 may further comprise activating 203 the digital lock. In one example, activating the inactive digital lock may be triggered by sending or receipt of an acceptance 7 by the first participant to the transaction. Additionally or alternatively, activating the inactive digital lock may comprise execution of a code segment in the proposed digital lock 9 by a participant to the transaction that activates the inactive digital lock.

In some embodiments, activating the inactive digital lock may further comprise the first participant validating the proposed digital lock 9 against data stored in at least one data store to determine a validation result.

The non-transitory computer-readable medium may further comprise program instructions that, when executed, cause the computer to store the activated digital lock in a private data store not recorded to the publicly-accessible GSL 1013 of the distributed ledger (e.g., ledger 13, 1007, or 1107). The private data store may be associated with the first participant, second participant or another node 11.

The method 200 may further comprise validating that the activated digital lock conforms to the inactive digital lock included with the proposed digital lock.

The method 200 may further comprise recording the activated digital lock in the distributed ledger (e.g., ledger 13, 1007, or 1107) or transmitting the activated digital lock for recordation in the distributed ledger (e.g., ledger 13, 1007, or 1107). In one example transmitting the activated digital lock comprises broadcasting 205 the activated digital lock for recordation in the distributed ledger.

As described above the method 200 may further comprise broadcasting 205 the activated digital lock for recordation in the distributed ledger (e.g., ledger 13, 1007, or 1107). In some examples, the first participant or second participant may be configured to transmit data to a central node 17 for recordation in the distributed ledger. Accordingly, the central node 17 may act as a writer node. In other examples, the first participant, second participant, and/or another node, may be configured to broadcast the activated digital lock for recordation in the distributed ledger. Broadcasting may include the first participant, second participant, or other node broadcasting the activated digital lock to the GSL 1013. Accordingly, the first participant, second participant, and/or other node may act as a writer node as described above to record evidence of the activated digital lock to the GSL 1013. If the first participant, second participant, or other node is not a writer node, the first participant, second participant, or other node may transmit data to a writer node for recordation to the GSL. In some embodiments, multiple writer nodes may form part of the network, and the writer nodes may use a consensus protocol to determine whether to record a proposed digital lock and/or its associated digital lock in the distributed ledger (e.g., ledger 13, 1007, or 1107). In some embodiments, evidence of the activated digital lock may comprise a cryptographic representation of the activated digital lock.

The method 200 may further comprise reading 207 the distributed ledger (e.g., ledger 13, 1007, or 1107) to confirm the distributed ledger contains the activated digital lock. Accordingly, the first participant, or second participant, and/or other node may act as a reader node. In some embodiments, the central node 17 may read on behalf of the first participant and/or second participant. Reading the distributed ledger 13 may comprise monitoring the distributed ledger (e.g., ledger 13, 1007, or 1107) for notifications from participating nodes on the GSL 1013, and aggregating a partial database of private data based on the monitoring.

Reading the distributed ledger (e.g., ledger 13, 1007, or 1107) may further comprise reading a first cryptographic representation (e.g., record) of the activated digital lock that is recorded in the distributed ledger. The cryptographic record of the activated digital lock recorded in the distributed ledger may comprise a first hash of the activated digital lock.

The method 200 may further comprise transferring 209 the digital asset from the first participant to the second participant to settle the transaction. In some examples, the method may further comprise reading the distributed ledger (e.g., ledger 13, 1007, or 1107) to confirm that the transaction has settled.

The method 200 may further comprise deactivating 211 the digital lock during, or subsequent to, settlement. In some embodiments, deactivating the digital lock may occur automatically upon settlement of the transaction. Deactivating the digital lock may comprise updating one or more parameters in the digital lock. Additionally or alternatively, deactivating the digital lock may comprise sending a token of deactivation between participants and/or nodes so that the participant/node that receives the token may update the one or more parameters in the digital lock to deactivate the digital lock. Additionally or alternatively, deactivating the digital lock may comprise execution of a code segment by a participant to the transaction and/or another node 11 that updates the distributed ledger (e.g., ledger 13, 1007, or 1107) to reflect that the digital lock is deactivated.

The non-transitory computer-readable medium may further comprise program instructions that, when executed, cause the computer to store the activated digital lock in a private data store not recorded to the distributed ledger (e.g., ledger 13, 1007, or 1107). In some embodiments, the private data store may be associated with the first participant or second participant. Accordingly, the private data store may be associated with a node or computer of the network.

The non-transitory computer-readable medium may further comprise program instructions that, when executed, cause the computer to generate a second cryptographic representation of the activated digital lock. The second cryptographic representation may be a second hash of the activated digital lock. The instructions may further cause the computer to compare the first and second cryptographic representations of the activated digital lock (e.g., compare the first hash and the second hash), and validate that the first and second cryptographic representations are the same.

In the non-transitory computer-readable medium, the proposed digital lock 9 may comprise program instructions that may be executed by a deactivating computer node in the network that owns the digital asset, or another computer node in the network permissioned by the deactivating computer node. In this way, when executed, the program instructions may act to deactivate the digital lock and permit transfer of the digital asset from the first transferring computer node to any other computer node in the network.

In some examples, execution of the program instructions described above may be authorised by a cryptographic signature. In this way, the first computer node 3 may cryptographically sign the proposed digital lock to cryptographically authorize execution of the program instructions.

The deactivating computer node described above may be the second computer node 5. In other examples the first transferring computer node may be the second computer node 5. The second receiving computer node may be the first computer node 3.

Further Examples of Transactions for Locking Digital Assets

As previously described, in a transaction for the transfer of a digital asset in which the transfer does not occur instantaneously or atomically, each node (such as the first node 3, second node 5 and/or another node 11) may bear a risk of non-performance related to the ultimate transfer of the digital asset. Examples of configurations of the present disclosure using technical features, such as digital locks, to mitigate this risk are now described below. It is to be understood that the examples below are exemplary configurations of the embodiments disclosed above. Thus, where the examples speak of digital locks, acceptance, or other such similar terms used above, it is to be understood that the embodiments above apply to such terms. Further, it is to be appreciated that digital ledger 230 in these examples may be any of the distributed ledgers 13, 1007, or 1107 detailed previously in the context of their respective systems/networks.

Bilateral Configuration

Figure 3:
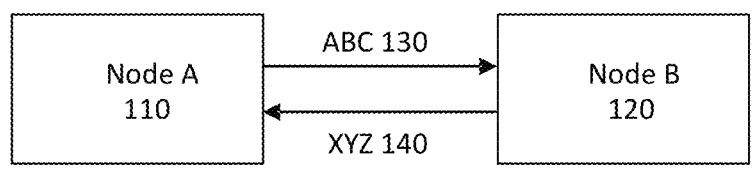
FIG. 3 illustrates an example of a digital bilateral transaction.

FIG. 3 illustrates an example of a risk of non-performance in a bilateral transaction where node A (110) is obligated to deliver digital asset ABC (130) to node B (120) in exchange for digital asset XYZ (140). Unless the exchange of ABC for XYZ occurs simultaneously, the node who delivers the digital asset first suffers risk of non-performance until the second node actually delivers. For example, in sports, where Team A has traded player ABC to Team B in exchange for player XYZ, this risk of non-performance forces the simultaneous assignment of player. As another example, in the finance industry, where Firm A is selling shares of ABC to Firm B for XYZ dollars, this risk forces the market to adopt delivery versus payment ("DVP") protocols to eliminate this risk of non-performance. Indeed, in any barter situation, where, for example, event venue A is exchanging tickets to ABC show to reseller B for XYZ dollars or for tickets to XYZ show, any delay in the exchange may create risk for the node that delivered first.

Figure 4:
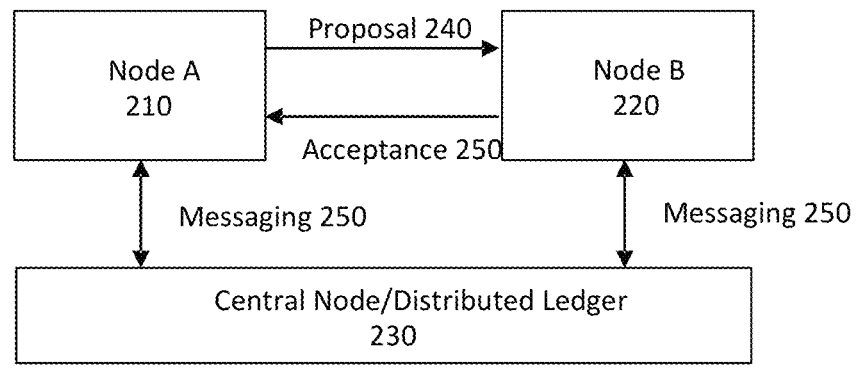
FIG. 4 illustrates an example of a locking mechanism in a digital bilateral transaction consistent with embodiments of the present disclosure.

The bilateral configuration in accordance with the present disclosure may use two (2) computer nodes, each with digital assets (or tokens) locked to each other. FIG. 4 illustrates two (2) exemplary computer nodes, node A (210) and node B (220). One node (node A in this example) may transmit a proposed digital lock (240) of an exchange of token (i.e., digital asset) ABC for token XYZ to the other node, and the other node (node B (220)) may transmit an acceptance (250) of that proposed digital lock to node A (250). Upon receipt of the acceptance (250) from node B, the digital locks may activate on token ABC at node A while the digital locks may activate on token XYZ at 140 (e.g., upon the transmittal of the acceptance by node B). The activated digital locks may force both node A and node B to transmit their respective tokens to the other node at the time of transaction to the exclusion of all other uses. Either one or both nodes may message the transaction (250), including the details of the tokens and the digital locks, to a central node and/or the distributed ledger (230) such as the GSL 1013. The central node and/or the distributed ledger may also be configured to vet the transaction against a central database or private data store and/or to record the transaction. Additional messaging back from the central node to node A and/or node B (250) may be performed to confirm the transaction, and once the transactions are written to the distributed ledger, one or both node A or node B may view such transaction on the distributed ledger (250).

Figure 5:
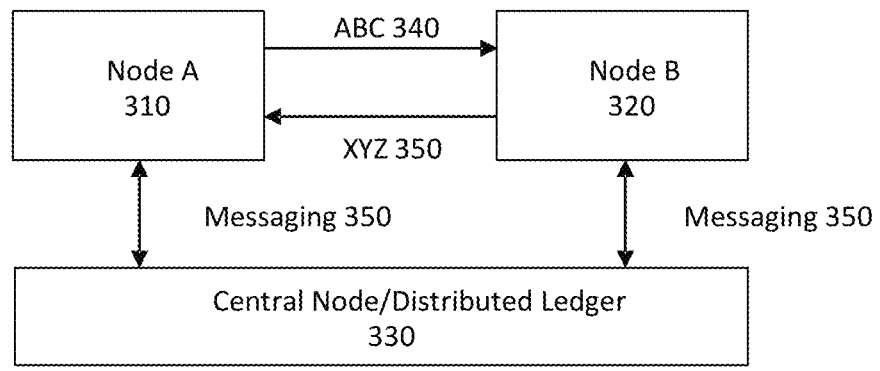
FIG. 5 illustrates an example of the digital bilateral transaction using the locking mechanism of FIG. 4.

FIG. 5 illustrates an example execution of bilateral transactions in accordance with the present disclosure. At the time of the transaction as agreed upon in the parameters of the proposed digital lock by node A (310) and node B (320), either node A or node B, or both nodes, which may be prompted by messaging (350) from the central node and/or the distributed ledger (330), may initiate the transfer of token ABC 340 for XYZ 350. Once node B receives token ABC, the digital locks on token ABC may deactivate and/or disappear. Similarly, once node A receives XYZ, the digital locks on token XYZ may deactivate and/or disappear.

Node A and/or node B may also message the central node and/or the distributed ledger that the transaction has been completed, the new ownership of the tokens, and/or the deactivation of the digital locks. Additionally, the central node and/or the distributed ledger may message the nodes that the transaction has been completed, the new ownership of the tokens, the deactivation of the locks, and/or all or any of the foregoing has been written to the distributed ledger.

By locking the delivery of the digital asset/token ABC from node A to node B and by locking the delivery of XYZ from node B to node A, embodiments of the present disclosure may eliminate the need for the nodes to simultaneously exchange digital assets/tokens in order to mitigate non-performance risk. Even if one node delivers its obligation early, embodiments of the present disclosure may ensure that the other digital asset/token will be delivered by the other node, e.g., by using digital locks. This may allow for surety in the buys and sells of securities or other assets where the payment or exchange is not made DVP. Because DVP is limited to currency for securities exchanges, the present embodiments provide technical means to allow surety in exchanges for one security type for another (e.g., securities loan transactions) or for exchanges of two currencies exchanges (e.g., foreign exchange transactions) that are not simultaneous. This configuration may additionally be applied to simple purchases and sales as well as other barters and exchanges of tokens and assets. For example, this configuration may show the first leg of repurchase transactions and securities loan transactions, with the tokens locked for the delivery of the receiver. By reversing the messaging, and the flow of tokens (token ABC transfers back to node A from node B, and token XYZ transfers back to node B from node A), in addition to the first step shown in FIG. 5, embodiments of the present disclosure allow for a full repurchase transaction and the full securities loan transaction.

Multi-Node Transaction

Figure 6:
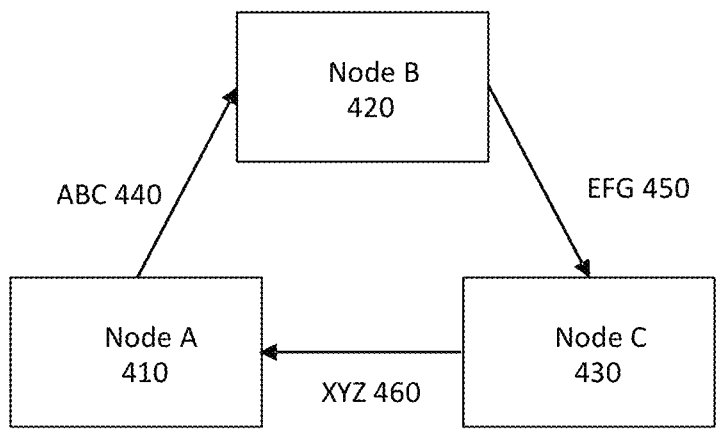
FIG. 6 illustrates an example of a digital multilateral transaction.

FIG. 6 illustrates a triparty exchange of assets, where node A (410) delivers token ABC (440) to node B (420) in exchange for receiving token XYZ (460) from node C (430), where node B (420) delivers token EFG (450) in exchange for receiving token ABC (440) from node A, and where node C (430) delivers token XYZ (460) to node A (410) in exchange for receiving token EFG (450) from node B. The coordination and timing of all three exchanges of tokens/assets are generally more difficult than in a bilateral exchange of tokens/assets, as described in the example above, and the difficulty increases as more nodes are added. Additionally, with more nodes exchanging tokens/assets in consideration for the receipt of tokens/assets from other nodes, each node may suffer the risk of non-performance (such as risk of technical failure, delivery risk, counterparty risk, bankruptcy risk) from the time each node delivers the assets/tokens until that node receives the assets/tokens promised. Unlike the bilateral example, where each node bears the non-performance risk of the other node, in multilateral transactions, each node bears the non-performance risk of all other nodes.

Figure 7:
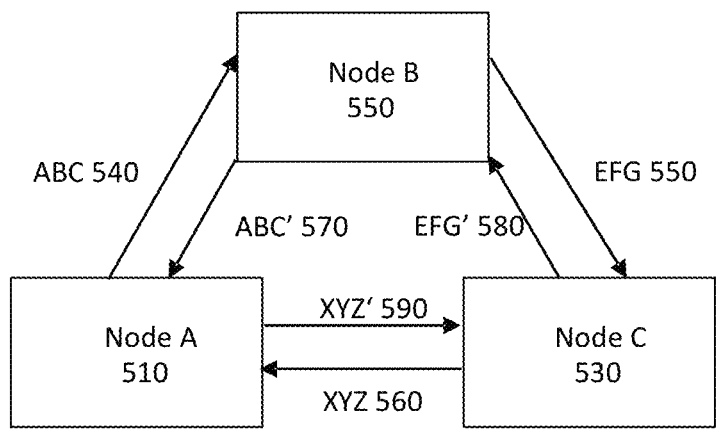
FIG. 7 illustrates an example of a digital multilateral transaction using additional tokens for risk mitigation.

Due to these risks, multi-node transactions are rarely structured as shown in FIG. 6. Instead, each of the nodes may often demand a simultaneous exchange of an offset token/asset to offset the risk it bears in delivering its token/asset. FIG. 7 shows how conventional mitigation of these risks complicates the transaction. The transaction in FIG. 5 is similar to that of FIG. 6: node A (510) delivers token ABC (540) to node B (520) in exchange for receiving token XYZ (560) from node C (530); node B (520) delivers token EFG (550) in exchange for receiving token ABC (540) from node A, and node C (530) delivers token XYZ (560) to node A (510) in exchange for receiving token EFG (550) from node B. However, in order to mitigate each risk of non-delivery, each of the nodes have demanded an exchange from the receiving party to offset their delivery because most bilateral transactions may be made simultaneously. Thus, node A has demanded node B transfer token ABC' (570) in exchange for token ABC (540); node B has demanded node C transfer token EFG' (580) in exchange for token EFG (550) and node C has demanded node A transfer token XYZ' (590) in exchange for token XYZ (560).

This demonstrates the need for the multimode configuration of the present disclosure because the risk mitigation efforts of each of the three (3) nodes have forced the parties to include three additional tokens that were unnecessary. The resulting structure is essentially three (3) bilateral transactions (one between node A and node B, one between node B and node C, and one between node C and node A), and demonstrates why multi node transactions are currently structured as a series of inefficient bilateral transactions. Additionally, if tokens ABC, EFG, and XYZ are of equal value, then the exchange tokens of ABC', EFG', and XYZ' may be the same token (cash or other token of value) representing the shared value of the actual targets of the transaction. The fact that risk mitigation requires a value token essentially make a round trip amongst nodes A, B, and C further highlights the inefficiencies of the current system. Indeed, conventional multi-party transactions involve greater network and processing resources being expended, as well as unnecessary lengthening of a ledger on which the transactions are recorded.

Figure 8:
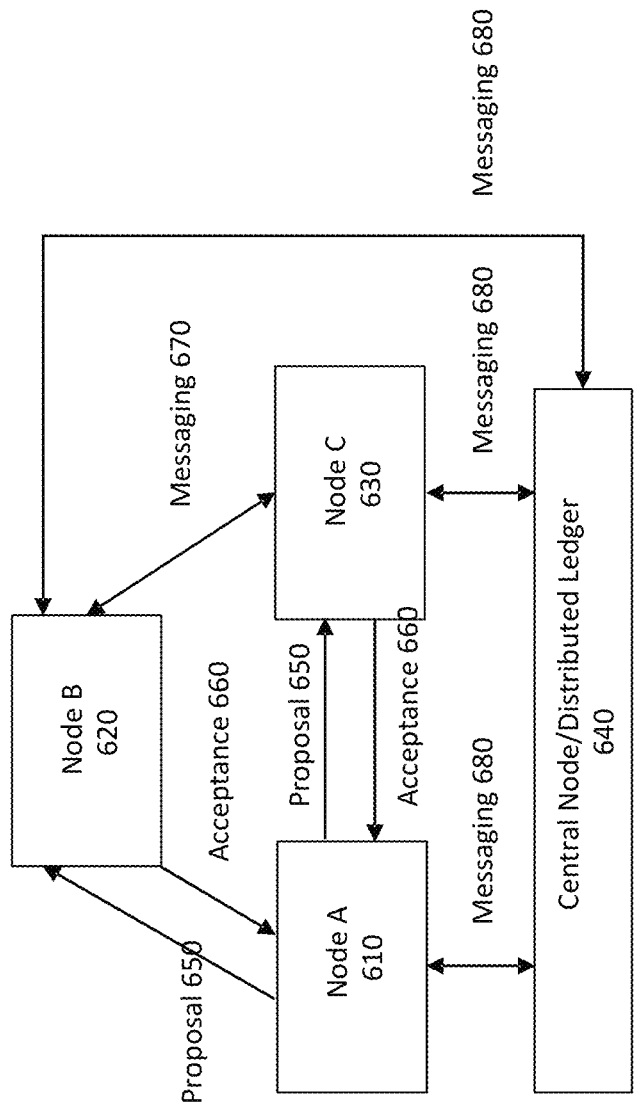
FIG. 8 illustrates an example of a locking mechanism in a digital multilateral transaction consistent with embodiments of the present disclosure.

Embodiments of the present disclosure allow for multiparty transactions by linking three (3) nodes, with each node committed to transfer the respective token as shown in FIG. 6. FIG. 8 demonstrates such configuration with three (3) nodes, node A (610), node B (620), and node C (630). Node A initiates the transaction by messaging a proposed digital lock to nodes B and C (650). Nodes B and C transmit their acceptance to node A (660). This messaging of the proposed digital lock and acceptance may also be transmitted between nodes B and C (670), whether as a means of ensuring the acceptance of all nodes or as a means of informing nodes B and C of the other's status in the transaction. Accordingly, fewer network and processing requires are expended because digital locks are exchanged and activated rather than unnecessary additional tokens (or other digital assets).

Alternatively, and not shown in FIG. 8, two (2) or all three (3) nodes may transmit identical proposed digital locks to the other nodes, and as long as the identical proposed digital locks are accepted by all, a transaction may be made and the tokens locked.

Embodiments of the present disclosure may further identify whether a proposed digital lock has been accepted by all nodes or whether matching proposed digital locks have been made by several parties and accepted by all nodes. Once the transaction has been accepted by all nodes (with the node that proposed the transaction deemed to have accepted its own proposed digital lock), the relevant assets may be digitally locked and committed to the transaction to the exclusion of all other uses.

Any one or all of the nodes may message the transaction (680), e.g., including the details of the tokens and the digital locks, to a central node and/or the distributed ledger (640). The central node and/or the distributed ledger may also be configured to vet the transaction against a central database or private data store, and/or to record the transaction to the distributed ledger. Additional messages may be exchanged from the central node to node A, node B, and/or node C (680) to confirm the transaction. Once the transactions are written to the distributed ledger, one or all of node A, node B, and node C may view such transaction on the distributed ledger.

Figure 9:
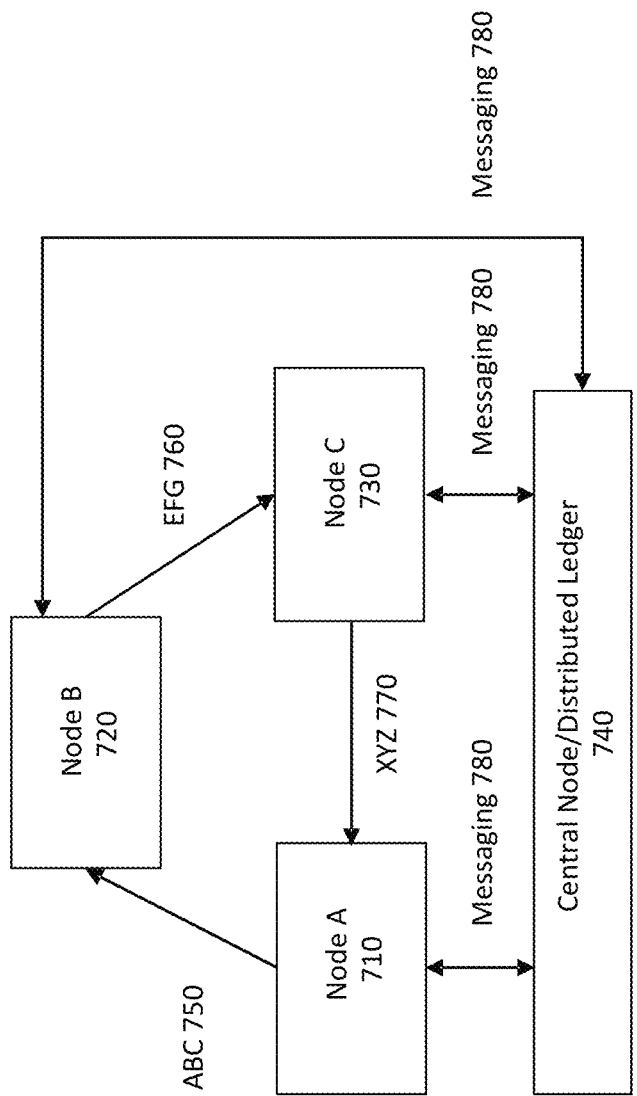
FIG. 9 illustrates an example of the digital multilateral transaction using the locking mechanism of FIG. 8.

FIG. 9 illustrates an example execution of multi-node transactions. At the time of the transaction as agreed upon in the parameters of the proposed digital lock/smart contract by node A (710), node B (720), and node C (730), one or all of node A, node B, and/or node C, which may be prompted by messaging (780) from the distributed ledger (730), may initiate the transfer of token ABC (750) from node A to node B in exchange for the transfer of token EFG (760) from node B to node C, and the transfer of XYZ (350) from node C to node A. Once node B receives token ABC, the digital locks on token ABC may deactivate and/or disappear. Similarly, once node C receives token EFG, the digital locks on token EFG may deactivate and/or disappear, and once node A receives XYZ, the digital locks on token XYZ may deactivate and/or disappear.

Nodes A, B and/or C may message the central node and/or the distributed ledger that the transaction has been completed, the new ownership of the tokens, and/or the deactivation of the digital locks. Additionally, the central node and/or the distributed ledger may message the nodes that the transaction has been completed, the new ownership of the tokens, the deactivation of the digital locks, and/or all or any of the foregoing has been written to the distributed ledger.

There may be any number of nodes as described above, with each node trading tokens with one or more of the other nodes in larger and more complex transactions. Each of the configurations may operate as described above.

Embodiments of the present disclosure may thus allow nodes to enter into multiparty transactions across many applications, from securities sourcing to multi-team/multileague player trades while using technical features to mitigate the risks inherent in such transactions today and without the inefficient structuring issues encountered today (e.g., reducing processing resources and/or network resources required to structure the transaction).

Chain-Node Configuration

Figure 10:
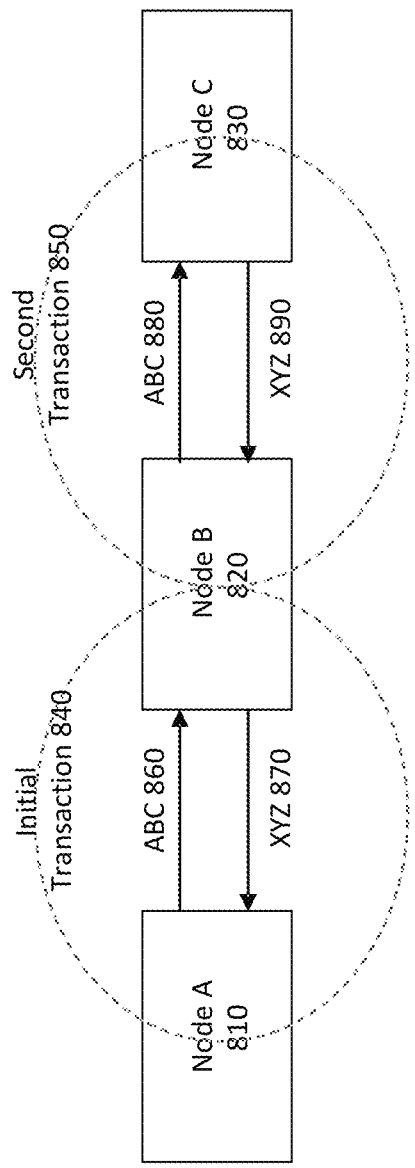
FIG. 10 illustrates an example of a cleared transaction.

Embodiments of the present disclosure may also be configured to address transactions involving middlemen, clearing entities, or central securities depositories. FIG. 10 illustrates that even a simple example of a cleared transaction creates market inefficiencies. In this example, node A (810) and node C (830) may clear their trade via node B (820). The basic transaction is a bilateral transaction whereby node A will deliver token ABC to node B in exchange for node B's delivery of token XYZ to node A. However, due to market infrastructure (e.g., the use of dematerialized securities) or other reasons (e.g., the use of exchange or system bound tokens), node A and node C are unable to transact directly. Instead, they must transact via node C, an intermediary. This transaction may therefore require the nodes to break down the overall transaction into two (2) legs, the initial transaction (840) between node A and node B, and the second transaction (840) between node B and node C (850). In transaction 840, node A may transmit token ABC (860) to node B in exchange for the transmittal of token XYZ (870) by node B to node A. In transaction 850, node B may transmit token ABC (880) to node C in exchange for the transmittal of token XYZ (890) by node C to node B.

In conventional techniques, the nodes may be forced into two (2) transactions to avoid the risks of performance failures by the other nodes. Otherwise, once node A delivers token ABC to node B, node A may bear risk of non-performance (along with technological failure, bankruptcy, counterparty, market, and other risks) until node B receives token XYZ from node C and delivers token XYZ to node A. Node C may bear the same risk in delivering token XYZ until it receives token ABC. Therefore, to mitigate this risk, node A may transfer token ABC to node B in exchange for token XYZ from node B in the initial transaction, and node B may exchange token ABC to node C in exchange for token XYZ from node C. However, this solution creates a burden on node B to source an extra token XYZ in order to fulfil its obligations on the initial transaction, as node B will not receive token XYZ from node C until after the completion of the second transaction. This inefficiency means that node B bears the risk of technological failure, market risk, and sourcing costs until the completion of the second transaction when it receives token XYZ from node C. Moreover, it results in greater processing and/or network resources being expended.

Figure 11:
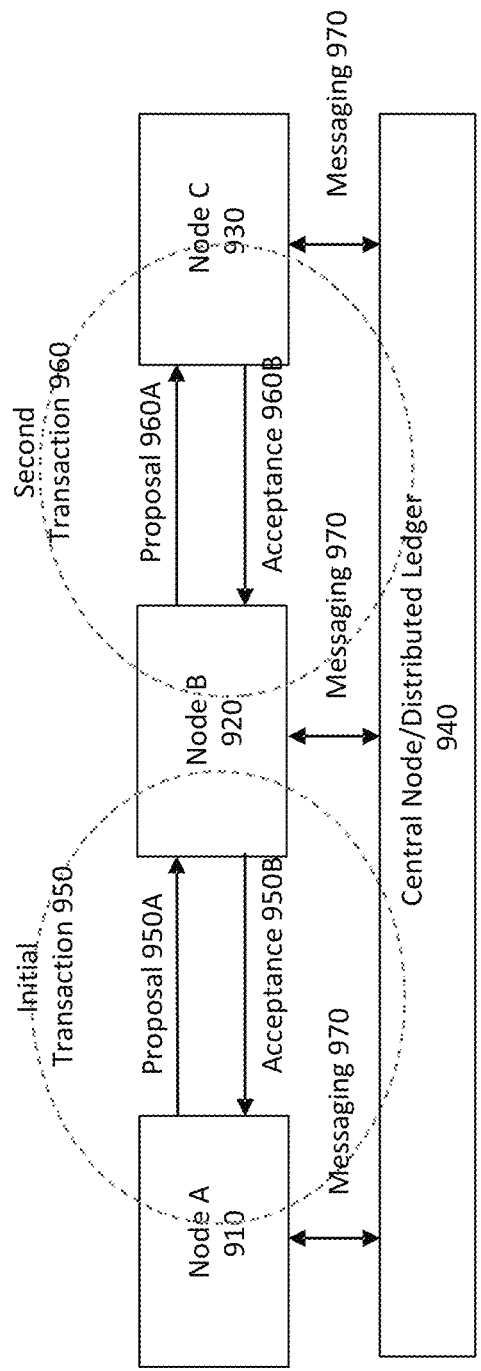
FIG. 11 illustrates an example of a locking mechanism in a cleared transaction consistent with embodiments of the present disclosure.

Embodiments of the present disclosure may support cleared transactions by linking three (3) nodes in a chain, with each node committed to transfer the respective token as shown in FIG. 10. FIG. 11 depicts an example of such a configuration with three nodes, node A (910), node B (920), and node C (930). Node A may initiate the transaction by messaging a proposed digital lock to node B (950A), which may be passed through to node (960B). Such messaging may comprise separate proposed digital locks or may comprise a single proposed digital lock. Nodes B and C may transmit their acceptance to node A (950B and 960B). This messaging of proposed digital lock and acceptance may also be transmitted between directly between node A and node C, whether to ensure the acceptance of all nodes or to inform nodes B and C of the other's status in the transaction.

Alternatively, and not shown in FIG. 11, two (2) or all three (3) nodes may transmit identical proposed digital locks to the other nodes, and as long as the identical proposed digital locks are accepted by all, a transaction may be made and the tokens locked. Embodiments of the present disclosure may further identify whether a transaction proposed digital lock has been accepted by all nodes and/or whether matching proposed digital locks have been made by several parties and accepted by all nodes. Once the transaction proposed digital lock has been accepted by all nodes (with the node that proposed the transaction deemed to have accepted its own proposed digital lock), the relevant assets may be considered digitally locked and committed to the transaction to the exclusion of all other uses.

Any one or all of the nodes may message the transaction (970), including the details of the tokens and the activated digital locks, to a central node and/or the distributed ledger (940). The central node and/or the distributed ledger may also vet the transaction against a central database or private data store and/or record the transaction. Additional messages may be exchanged from the central node to node A, node B, and/or node C (970) to confirm the transaction. Once the transactions are written to the distributed ledger, one or all of node A, node B, and node C may view such transaction on the distributed ledger.

Figure 12:
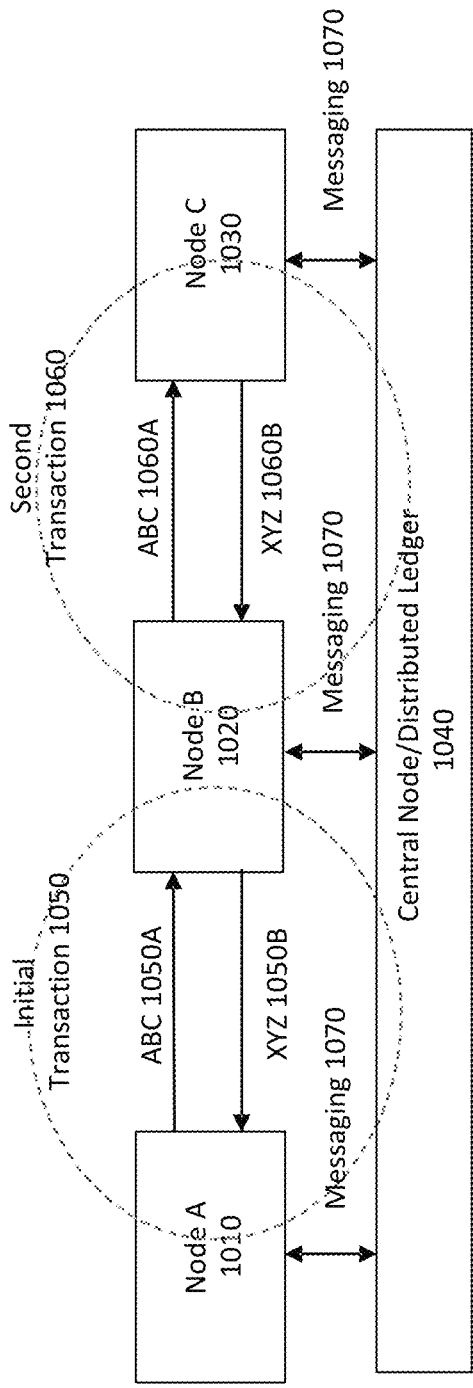
FIG. 12 illustrates an example of the cleared transaction using the locking mechanism of FIG. 11.

FIG. 12 illustrates an example execution of multi-node transactions. At the time of the transaction as agreed upon in the parameters of the proposed digital lock by node A (1010), node B (1020), and node C (1030), one or all of node A, node B, and/or node C, which may be prompted by messaging (1070) from the distributed ledger (1030) may affect the initial transaction by the transferring token ABC (1050A) from node A to node B in exchange for the transfer of token XYZ (1050B) from node B to node A. Once completed, the second transaction may begin with the transfer of token ABC (1060A) from node B to node C in exchange for the transfer of token XYZ (1060B) from node C to node B. Once node C receives token ABC, the digital locks on token ABC may deactivate or disappear. Similarly, once node A receives XYZ, the digital locks on token XYZ may deactivate or disappear.

Nodes A, B and/or C may message the central node and/or the distributed ledger that the transaction has been completed, the new ownership of the tokens, and/or the deactivation of the digital locks. Additionally, the central node and/or the distributed ledger may message the nodes that the transaction has been completed, the new ownership of the tokens, the deactivation of the digital locks, and/or all or any of the foregoing has been written to the distributed ledger.

Embodiments of the present disclosure may also be configured for any number of nodes, each chained in a long line between two end nodes as described above, with each intervening node transferring tokens between the two (2) ultimate nodes. Each of these configurations may operate as described above.

Figure 13:
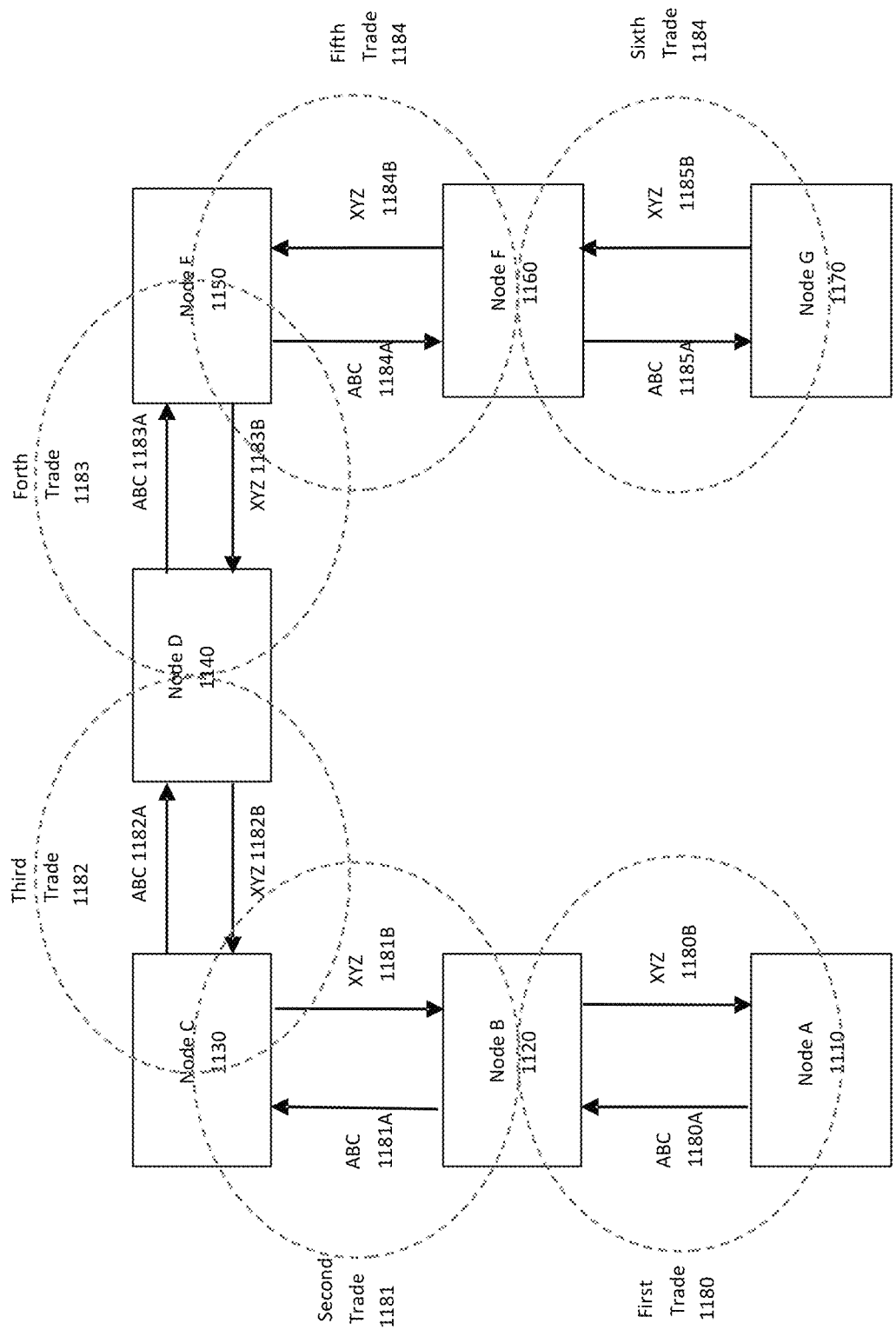
FIG. 13 illustrates an example of a transaction for transacting dematerialized securities between several nodes, for example, in a chain-node configuration.

FIG. 13 depicts a transaction between two (2) ultimate nodes that will involve seven (7) nodes, with five (5) intermediary nodes. FIG. 13 may represent an example of a simple chain or may also be viewed as an example of a conventional financial transaction for transacting dematerialized securities. Here, the nodes at the end, node A (1110) and node G (1170) may be the ultimate counterparties clearing a transaction through a central counterparty, node D (1140). Node A may connect to node D via its intermediaries node B (1120) and node C (1130), while node G may connect to node D via its intermediaries node E (1150) and node F (1160). Node A may provide token ABC to node G in exchange for token XYZ. The conventional technique may include breaking the movement of the digital asset/token ABC from node A to node B into six (6) sequential bilateral transactions, moving token ABC from node A to node B (1180), from node B to node C (1181), from node C to node D (1182), from node D to node E (1183), from node E to node F (1184), and finally from node F to node G (1185).

As described above, embodiments of the present disclosure may solve this technical problem by utilising distributed ledger and smart contract technology to ensure that the digital asset is committed and digitally locked to its designated receiving node. In this way, if the integrity of a node in the chain of nodes from A to G is comprised (and/or the associated private data store is compromised), there remains a record of the commitment and digital lock of the digital asset on the distributed ledger.

In addition, because the digital lock is captured in a smart contract, there may be a technical advantage in that the digital lock can be activated (or deactivated) despite the status of a node in the chain of nodes from A to G.

Embodiments of the present disclosure may provide a way to mitigate the risk of non-performance of all parties in the chain of nodes from A to G. Otherwise, every node that delivers token ABC to the next node in the chain may bear risk of non-performance (along with technological failure, bankruptcy, counterparty, market, and other risks) until the nodes down the chain each receive token XYZ and deliver token XYZ back to that node. Similarly, every node that delivers XYZ up the chain bears risk of non-performance (along with technological failure, bankruptcy, counterparty, market, and other risks) until the nodes up the chain each receive token ABC and deliver token XYZ back to that node. Although breaking the overall transaction into seven bilateral transactions may mitigate the risks for node A and node G, it creates a burden on each of the intervening nodes to source an extra token XYZ in order to fulfil its obligations on the initial transaction, as each intervening node will not receive token XYZ from the next node in the chain until after the completion of the next transaction which such node is obligated to deliver token XYZ in the current transaction. This inefficiency means that each intervening node bears market risk and sourcing costs until the completion of the next transaction when it delivers token ABC and receives token XYZ from next node in the chain. Moreover, each node incurs greater processing and networking costs through the bilateral transactions. This is the same issue illustrated in FIG. 10, but magnified across multiple nodes.

Figure 14:
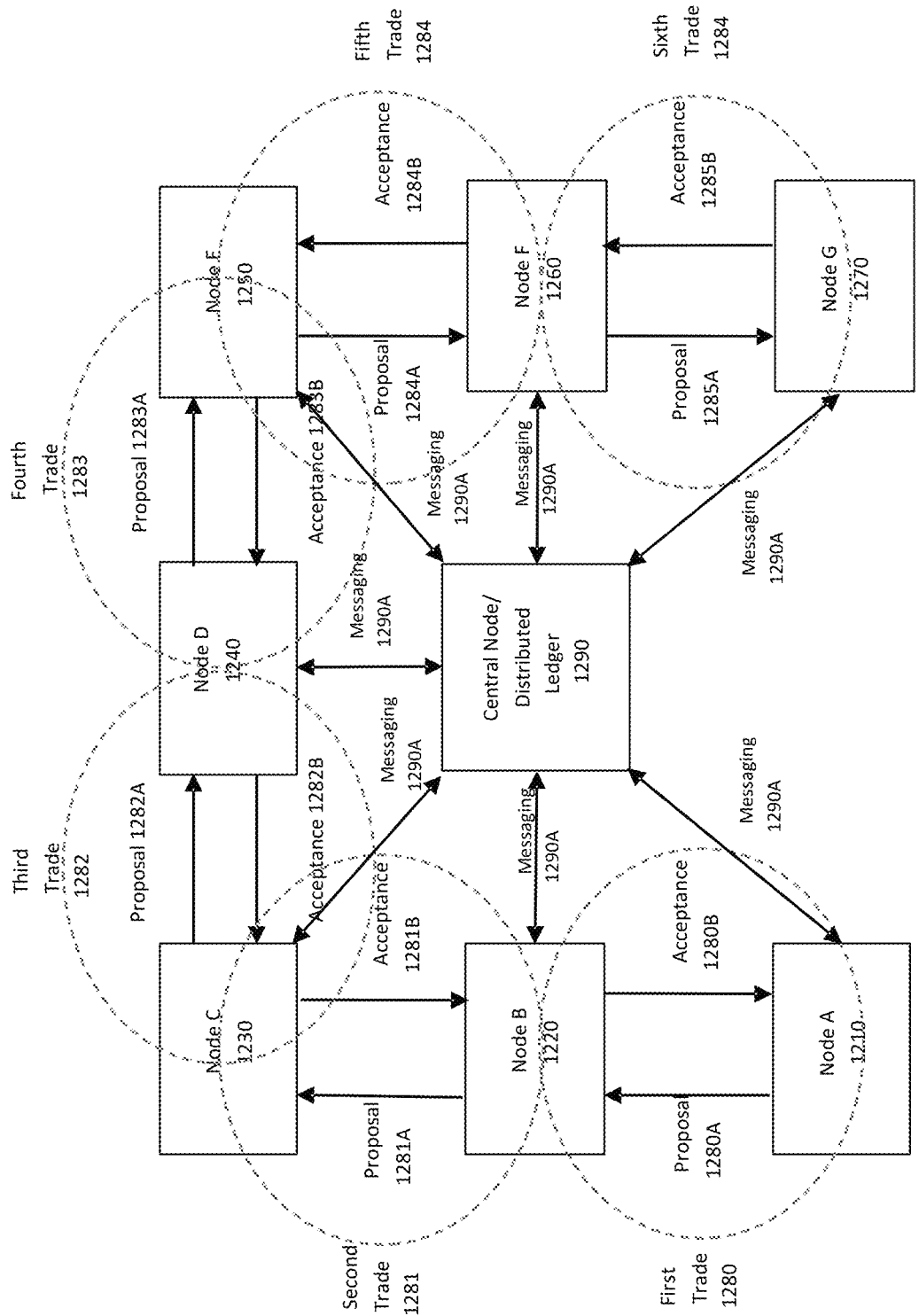
FIG. 14 illustrates an example of a locking mechanism in a dematerialized securities transaction between several nodes consistent with embodiments of the present disclosure.

Embodiments of the present disclosure support dematerialized securities by linking all of the nodes in a chain, with each node committed to transfer the respective token as shown in FIG. 13. FIG. 14 demonstrates such configuration with seven nodes, node A (1210), node B (1220), node C (1230), node D (1240), node E (1250), node F (1260), and node G (1270). Node A may initiate the transaction by messaging a proposed digital lock/smart contract to node B (1280A) which may be passed through all of the other nodes (1280A, 1281A, 1282A, 1283A, 1284A, and 1285A) to node G, replicated by each node such that each node accepts the proposed digital lock/smart contract and sends a mirror proposed digital lock/smart contract to the next node in the chain, and/or transmitted down the chain by a combination of pass throughs and/or mirrors.

Intervening nodes that have a right to reject the transaction may receive a mirror proposed digital lock/smart contract and may have the ability to accept or reject the transaction. Intervening nodes that do not have the right to reject the transaction may automatically pass through the proposed digital lock/smart contract down the chain. If each node in the chain with the right to accept or reject the transaction elects to accept the transaction, each node may transmit and/or pass through the acceptance to node A (1285B, 1284B, 1283B, 1282B, 1281B, and 1280B). This messaging of acceptance may additionally or alternatively be transmitted between directly between node A and node G.

Alternatively, and not shown in FIG. 14, two (2) or more nodes may transmit identical proposed digital locks to the other nodes, and as long as the identical proposed digital locks are accepted by all, a transaction may be made and the tokens locked. Embodiments of the present disclosure may further identify whether a transaction proposed digital lock has been accepted by all nodes or whether matching proposed digital locks have been made by several parties and accepted by all nodes. Once the transaction has been accepted by all nodes (with the node that proposed the transaction deemed to have accepted its own proposed digital lock), the relevant digital assets/tokens may be digitally locked and committed to the transaction to the exclusion of all other uses. In this example, each token is locked and committed through the entire chain, in the case of token ABC, from node A through to node G, and, in the case of token XYZ, from node G to node A. Any one or all of the nodes may message the transaction (1290A), including the details of the tokens and the digital locks, to a central node and/or the distributed ledger (1290). The central node and/or the distributed ledger may vet the transaction against a central database and/or private data store and/or may record the transaction. Additional messages may be sent back from the central node to each of the nodes (1290A) to confirm the transaction. Once the transactions are written to the distributed ledger, one or all of the nodes may view such transaction on the distributed ledger (1290A).

Figure 15:
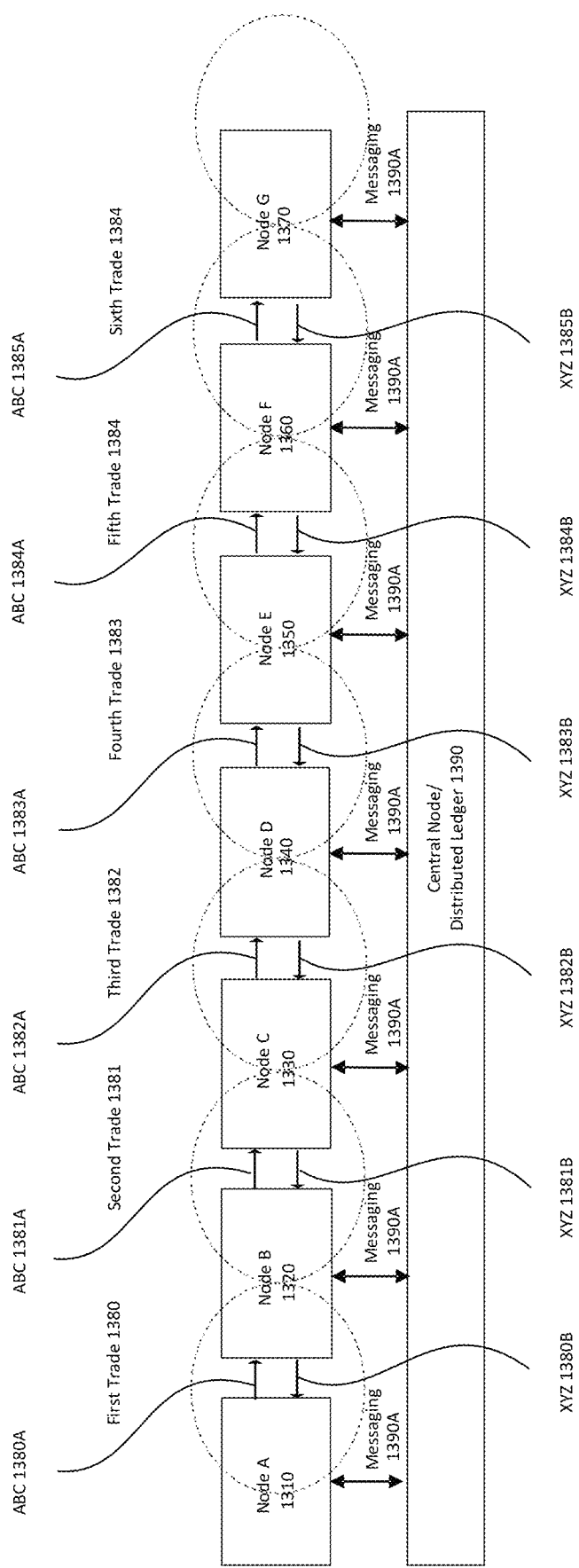
FIG. 15 illustrates an example of the dematerialized securities transaction using the locking mechanism of FIG. 14.

Embodiments of the present disclosure may support the execution of multi-node transactions as illustrated in FIG. 15. At the time of the transaction agreed upon by node A (1310) and node G (1370) or by all of node A, node B (1320), node C (1330), node D (1340), node E (1350), node F (1360), and node G, one or all of nodes, which may be prompted by messaging (1390A) from the distributed ledger (1390) may affect the initial transaction (1380) by the transferring token ABC (1380A) from node A to node B in exchange for the transfer of token XYZ (1380B) from node B to node A. Once completed, the second transaction may begin with the transfer of token ABC (1381A) from node B to node C in exchange for the transfer of token XYZ (1381B) from node C to node B. The third transaction (1382), fourth transaction (1383), fifth transaction (1384) and sixth transaction (1385) may all be completed in succession. Once node G receives token ABC, the digital locks on token ABC may deactivate or disappear. Similarly, once node A receives XYZ, the digital locks on token XYZ may deactivate or disappear.

There may be any number (or all) of nodes A, B, C, D, E, F, or G that message the central node and/or the distributed ledger that the transaction has been completed, the new ownership of the tokens, and/or the deactivation of the digital locks. Additionally, the central node and/or the distributed ledger may message any (or all) of the nodes that the transaction has been completed, the new ownership of the tokens, the deactivation of the digital locks, and/or all or any of the foregoing has been written to the distributed ledger.

As shown in FIGS. 10, 11, 12, 13, 14, and 15, embodiments of the present disclosure may be modified and adapted to any number of nodes to commit and digitally lock a token/digital asset from the first node of the chain to the last node in the chain.

Return Lock Configuration

Embodiments of the present disclosure may also ensure the recovery of tokens or digital assets that have been previously transferred. A lender loaning an asset or token to a borrower bears risk of loss of the borrowed asset or token should the borrower, for whatever reason, fail to return the asset or token. For instance, electronic books and other digital media must be returned to the electronic library by the borrower of such electronic book or digital media, as the library bears the risk of non-performance (technological failure, counterparty, bankruptcy, market, and other risks), especially when limited licenses or other restrictions prevent such library from simply making additional copies of the electronic books or other digital media so borrowed. A seller in a repurchase agreement bears the risk of non-performance (technological failure, counterparty, bankruptcy, market, and other risks) for the return of the purchased securities, if the purchaser does not allow the repurchase of the purchased securities at the agreed-upon repurchase time.

Figure 16:
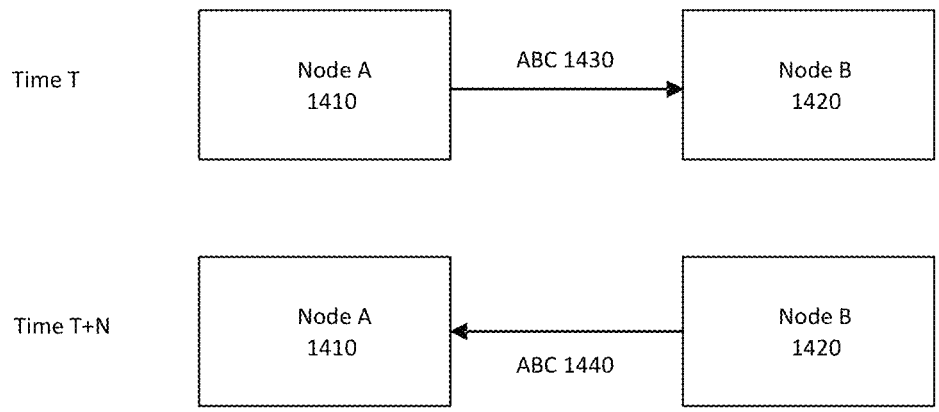
FIG. 16 illustrates a flow of transfer and return of a digital asset between multiple nodes.

FIG. 16 shows example flows of a transfer and return of a token between two (2) nodes, where at time T, node A (1410) transfers token ABC (1430) to node B (1420). At some later time, T+N, node B may be obligated to return token ABC to node A. From time T until the successful completion of the return on T+N, node A may bear the risk of loss of token ABC while token ABC is in the possession of node B. This risk of loss may be offset by inefficiencies in the form of collateral posted by node B to node A to secure its performance of the return of token ABC. For example, borrowers of digital media secure their loans by allowing a credit card hold. Similarly, securities borrowers and repo purchasers may post collateral.

Figure 17:
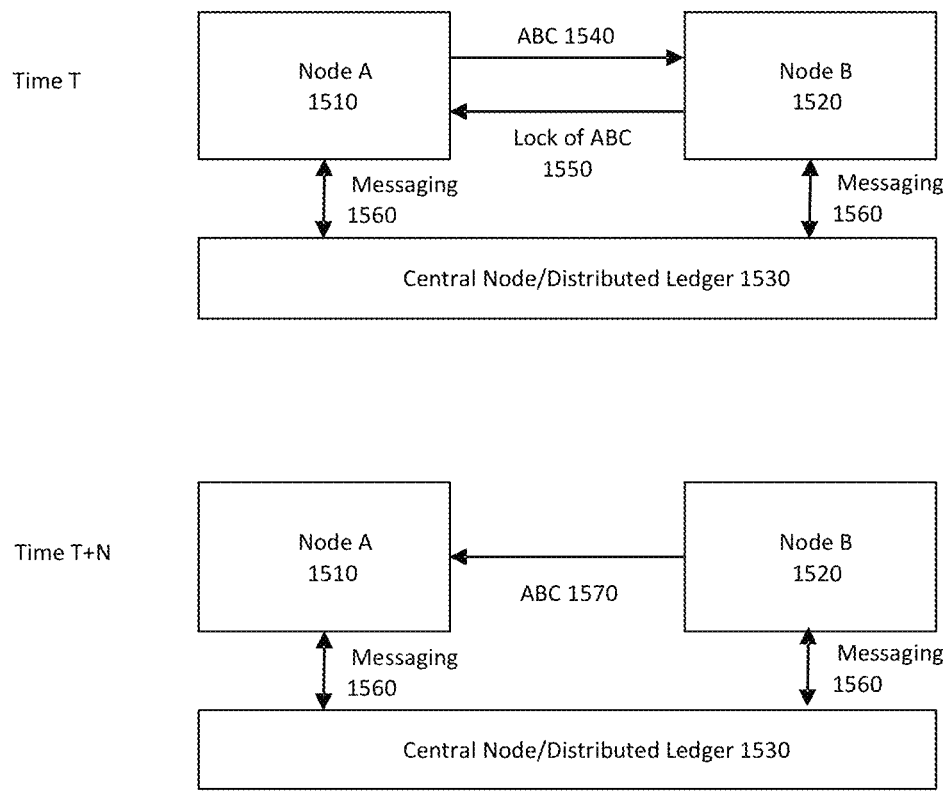
FIG. 17 illustrates an example of a configuration to allow a pledge back of a digital asset previously transferred, in accordance with the present disclosure.

FIG. 17 shows an embodiment of the present disclosure that may allow a pledge back of the previously transferred token/digital asset. By digitally locking the transferred token back to the originating node originally delivered it, embodiments of the present disclosure may mitigate the potential that the transferred token may be used for any other purpose and mitigate the risk of non-performance by the node which received the security (collateral). Moreover, embodiments of the present disclosure may mitigate these risks with fewer processing and network resources than conventional uses of intermediaries.

Referring to FIG. 17, at time T, node A may transfer token ABC (1540) to node B. Pursuant to the proposed digital lock governing such transfer, node A and node B may have agreed to digitally lock the return of ABC back to node A at time T+N. Thus, a digital lock may be placed upon token ABC while it is in possession of node B (1550). The digital lock may commit the return of token ABC to node A. Node A and/or node B may message the central node and/or the distributed ledger (1530) of the transfer of token ABC from node A to node B and of the digital lock of token ABC back from node B to node A. The central node and/or the distributed ledger may also vet the transaction against a central database and/or private data store, and/or may record the transaction. Additional messages may be sent back from the central node to each of the nodes (1560) to confirm the transaction. Once the transactions are written to the distributed ledger, one or all of the nodes may view such transaction and/or the digital lock on the distributed ledger (1560). At time T+N, node B, which may be prompted by the central node and/or the distributed ledger, may affect either the digital lock and/or smart contract governing such transfer, and transfer token ABC back to node A (1570).

Figure 18:
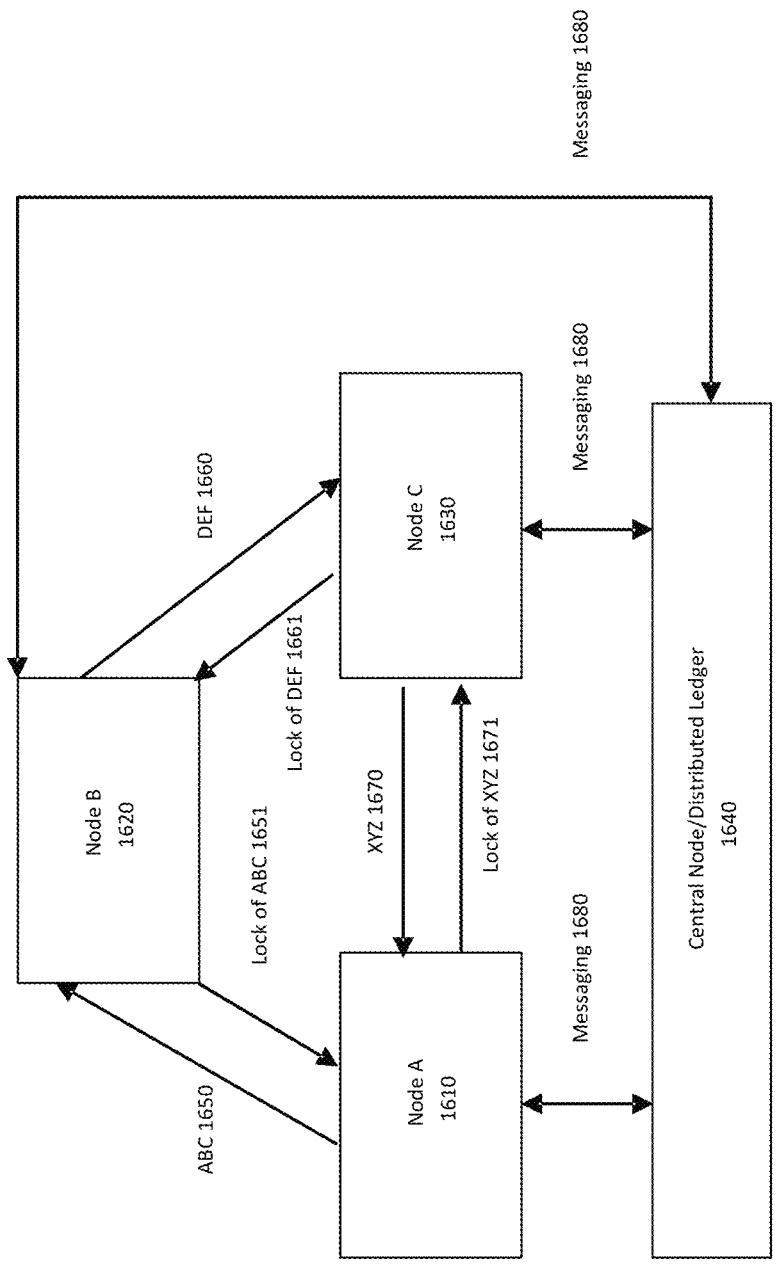
FIG. 18 illustrates an example of a configuration for return locks, in accordance with the present disclosure.
Figure 19:
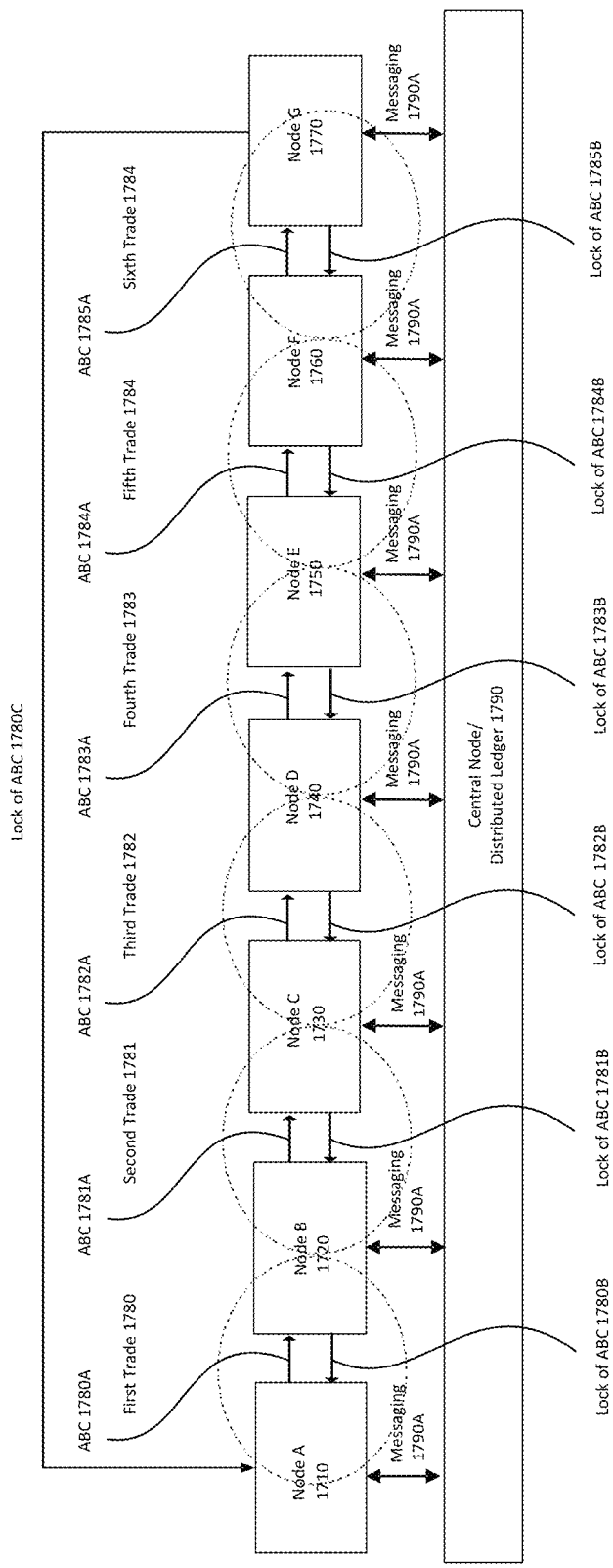
FIG. 19 illustrates a further example of a configuration for return locks, in accordance with the present disclosure.

These return locks may also be configured consistent with both the chain and multi-node configurations as shown in FIGS. 18 and 19.

The proposed digital lock in a chain configuration may be accomplished on a node by node basis or directly from the last node to the first node at the ends of the chain.

Further Examples of Locking Digital Assets and DAML

Further examples of use cases for the disclosed system and method of locking a digital asset are described below. These examples include mechanisms for locking digital assets and committing them for the intended purpose of a particular transaction and for recording ownership, security interests, future dated transfer instructions, and other legal and transactional data directly with respect to each dematerialized security for each individual unit of such security or with respect to a securities intermediary's holdings of a physical asset, without the need to segregate that unit from others in the same asset type.

The proposed digital lock 9 may prevent the individual asset from being used by the owner, securities intermediary, or any third party for any purpose other than the settlement of the agreement to which the security has been committed. Where current market infrastructure may take weeks to open control accounts or to create memo pledges, embodiments of the present disclosure may allow the near instantaneous creation of as many proposed digital locks as needed to facilitate transactions requiring such locks. Embodiments of the present disclosure may also provide a ready and efficient mechanism for parties to perfect their security interests in the assets subject to settlement so as to legally protect the commitment of the proposed digital lock. Embodiments of the present disclosure may further provide reporting functions that allow each of the asset owner, the securities intermediary, and the secured party to observe any asset owned, pledged to, or held by it anywhere on any system that records movements of the asset. The transactions may be affected by an automated smart contract and recorded to a distributed ledger.

As described above, the proposed digital lock 9 may be a commitment of a digital asset to one purpose to the exclusion of other purposes and of an immutable recording of that agreement to the distributed ledger of that asset in order to prevent such digital asset from being used for any other purpose. The proposed digital lock 9 may be the result of an agreement between two or more parties, or the decision of one party, to transfer a digital asset to another party on a certain date as based on agreed parameters contained within the proposed digital lock 9. The proposed digital lock 9 may also be the option of a party to decide the future commitment (transfer, sale, pledge, etc.) of the asset.

Accordingly, embodiments of the present disclosure may include a ledger system including data structures stored on computer readable media and capable of distinguishing individual assets from the overall asset position, and capable of recording attributes and trade details directly with the asset in a manner that can designate ownership interest, security interest, a purpose for that asset (e.g., a designated future date of transfer to a specific receiver, a hold on the asset that awaits a specific entity's exercise on an option for future transfer, etc.) and other necessary or desired details. Embodiments of the disclosure further include a method for parties to agree upon transactions affecting securities, including a node that can match the instructions of one party wishing to enter into a transaction with respect to the asset with the agreement of the counterparty or counterparties to that transaction, whereupon a node records the matched instructions and the agreed upon transaction by embedding the transaction details upon the ledger and/or upon the asset itself. These transaction details may serve as a proposed digital lock, which may prevent the system from using the asset for any other purpose.

In conventional techniques, securities may be held in an account for an owner. The holding of these securities may be represented as a sum or total position (e.g., shares of an equity, units of fixed income), often making it difficult to distinguish portions of the same securities in an account. In some embodiment, a party's holdings of a security may be represented by discrete positions of securities or in the form of a contract or contracts, which may distinguish between the total holdings of a security (e.g., 1000 shares of ABC), any specific portion of the holdings of a security (e.g., 100 of the 1000 shares of ABC) or a specific, single unit of the holdings of a security (e.g., 1 of the 1000 shares of ABC). Further, embodiments of present the disclosure may use DAML's ability to validate contracts and to schedule their settlement as the proposed digital lock 9 and may also record the projected future movement of the asset, whenever that may be, or the option for a designated party to exercise its right to select or reject a movement of the asset. This ability for asset and obligation management using flexible settlement times is described in U.S. patent application Ser. No. 15/247,546 filed on Aug. 25, 2016, the disclosure of which is incorporated herein by reference in its entirety.

In a proposed digital lock 9, DAML may be used to revoke all parties', including the Owner's and the Controller's, right to transfer for any purpose other than the purpose of the proposed digital lock 9, thus locking the security from movement or other actions. Embodiments of the present disclosure may also include conditions for the removal of the proposed digital lock 9 should certain criteria be met. Accordingly, the ability to lock an asset in the proposed digital lock 9 may ensure that ownership of that asset is maintained by the Owner (such as the first computer node 3), while guaranteeing to another party (e.g., the second computer node 5, the recipient of delivery or pledgee of the asset in a settlement) that the Owner cannot transfer, sell, pledge or otherwise dispose of that asset pending the settlement at a future date with such other party.

Some embodiments of the present disclosure may further enhance current market practice by integrating legal requirements for ownership and security interests directly into financial infrastructure, by allowing a much easier linkage and record keeping of ownership rights and security interests directly upon the asset itself, and by providing an easy and verifiable method for the perfection of a security interest. Sections 8 and 9 of the Uniform Commercial Code (UCC) generally provide that a secured party may perfect its security interest in a security if the securities intermediary has agreed that it will follow the entitlement order of the security party without the consent of a pledger. Section 9 of the UCC generally provides the same rule for deposit accounts. When the parties agree to a transaction or when one party has the right to write a transaction, the data embedded in the relevant asset may function as an entitlement order or an instruction to the securities intermediary holding the asset. Because the proposed digital lock may commit the asset to the terms of the contract to the exclusion of all other purposes, it may function a mechanism to prevent the securities intermediary from obeying the instructions of another party, including those of the owner/pledger.

Figure 20:
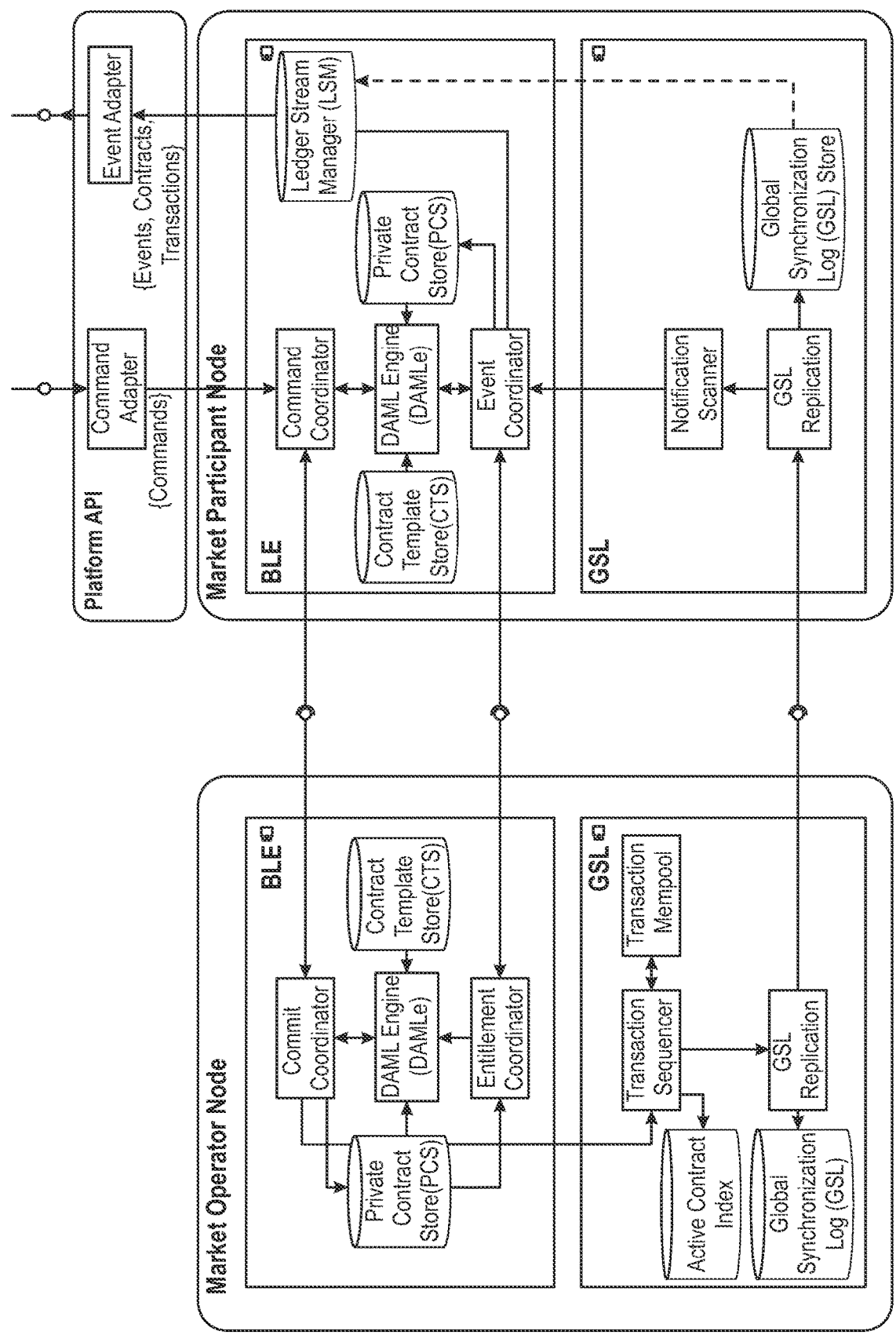
FIG. 20 illustrates an exemplary architecture for several nodes of a distributed network, which may be used in an embodiment of the present disclosure.

An example of how DAML Architecture may support Committed Settlement via a proposed digital lock is as follows and as shown in FIG. 20:

When a party with a Participant Node (the "Giver Participant", such as the first computer node 3 or second computer node 5) wants to initiate a DAML contract for a proposed digital lock 9, the Business Logic Engine (BLE) of the Giver Participant's Participant Node (the "Giver Participant Node") may first validate the form of the DAML contract with the Contract Template Store, part of the DAML Library. Passing that check, the BLE may validate the terms of the potential DAML contract, the DAML "offer", against the PCS (e.g., private data store) of the Giver Participant Node to authenticate the new DAML proposed digital lock 9, validate that the new DAML proposed digital lock 9 does not conflict with other contracts, confirm the digital assets necessary to fulfil the new DAML proposed digital lock 9 are available, and/or to vet other necessary aspects. Once that check is complete, the BLE may note the DAML proposed digital lock 9 on the Giver Participant Node's PCS and message that DAML proposed digital lock 9 to the PCS of the Operator.

The BLE of the Operator Node may perform the same validations, e.g., checking the DAML proposed digital lock 9 against the Contract Template Store of the DAML Library and vetting the validity and viability of the DAML proposed digital lock 9 with the Operator's PCS. Because the Operator's PCS may reflect the DAML smart contracts and digital asset positions of the entire market, the Operator's PCS may function as a more robust check for the DAML proposed digital lock 9 than the Participant Node's PCS. Once those checks are passed, the DAML Execution Engine of the Operator Node may sequence the DAML proposed digital lock 9 and write the DAML proposed digital lock 9 into the GSL, e.g., by adding the DAML proposed digital lock 9 into an encrypted block that is only readable by the Giver Participant and the Participants named as counterparties to the DAML proposed digital lock 9 (the Receiver Participant, such as the first computer node 3 or second computer node 5). Although this example uses a simple contract with only one Receiver Participant, the same process may apply to complex contracts with multiple Receiver Participants and multiple leg transactions.

Once the Receiver Participant decrypts the potential DAML contract from the GSL, the BLE of the Receiver Participant's Market Participant Node (the "Receiver Participant Node", such as the first computer node 3 or second computer node 5) may again perform the same validation checks against the Contract Template Store and its own PCS. Once passed, the Receiver Participant may choose whether to accept the DAML proposed digital lock 9. The BLE of the Receiver Participant Node may communicate the choice to the BLE of the Operator Node. If the Receiver Participant rejects the DAML proposed digital lock 9, the potential contract may be erased from the PCSs of the Operator Node and the Giver Participant Node. If the Receiver Participant accepts the terms of the DAML proposed digital lock 9, and if the acceptance (such as the acceptance 7) confirms the parameters and details of the DAML proposed digital lock 9, the BLE of the Operator Node, upon receipt of the acceptance from the Receiver Participant Node, may validate that the parameters of the acceptance received from the Receiver Participant conform with the parameters of the DAML proposed digital lock 9 offered by the Giver Participant (as shown in FIG. 21).

If there is a match, the DAML Execution Engine of the Operator Node may again sequence the now accepted DAML proposed digital lock 9 (now, a DAML Lock Contract) and write the DAML Lock Contract into the GSL, e.g., by adding the DAML Lock Contract into an encrypted block that is only readable by the Giver Participant and the Receiver Participant. Accordingly, the Operator Node may broadcast the activated digital lock for recordation in the distributed ledger by the first computer node 3, second computer node 5 and/or another computer node 11. Once the DAML Lock Contract is decrypted and read by the Giver Participant and the Receiver Participant, each of the BLEs of the Giver Participant Node and the Receiver Participant Node may record the DAML Lock Contract into their respective PCSs. This may include storing the activated lock, and/or deactivated lock associated with the digital asset, in the private data store of each respective Node.

In recording the DAML Lock Contract, the BLE may also process the linkages contained in each DAML contract, e.g., locking the assets, in the amounts, tenors, and other identified characteristics, according to the parameters of the contract identified by the linkages. These proposed digital locks 9 may also indicate both the mechanics of the DAML Lock Contract, such as the time and date of the transfer of the asset in order to fulfil the DAML Lock Contract, the future of the asset as the result of the transfer, the amount of the assets to transfer, among other parameters, as well as the legal aspects of the DAML Lock Contract, such as the beneficial owner of the asset, the secured party or parties, among other parameters. FIG. 21 represents example parameters for each of the DAML Lock Proposal, the DAML Lock Contract, and the security. Each of the parameters of the DAML Lock Proposal may be matched by both the Giver Participant and the Receiver Participant in order for a DAML Lock Proposal to become a DAML Lock Contract. These proposed digital locks 9 may prevent the asset from being used for any other purpose, except for purposes of settling the transaction that transfers the digital asset from the Giver Participant (associated with the first computer node 3) to the Receiver Participant (associated with the second computer node 5). These uses may be prevented by preventing the BLEs of the Market Participant Nodes and the BLE of the Market Operator Node from validating any other potential DAML contract or accepted DAML contract that would purport to assign a different purpose to the Locked asset and/or by preventing the DAML Execution Engines of the Market Participant Node and the Market Operator Node from recording the transfer of the Locked asset in any manner except for the purpose of the proposed digital lock. The GSL may further alert relevant Participants and, if different than the parties to the contract, the future receiver of the Locked asset, of the DAML Lock Contract and of the assets so Locked in accordance with the Asset.

The DAML contracts and the Locking mechanisms for locking of a digital asset may also be flexible enough to accommodate options such that the proposed digital lock 9 may not contain a definitive transfer time and target. In embodiments where the DAML Lock Contract is an option contract, a designated Participant (whether the Receiver Participant or otherwise) may have, at some future date, an option to exercise against the Locked security, the DAML contract written on the PCS of the relevant computer nodes (e.g., nodes 3, 5, or 11) may also note the parameters, the identity of the Participant, the date and criteria for the exercise, etc., for the exercise of that option. These parameters may allow the asset to be Locked without putting a definite transfer date and time onto the proposed digital lock 9. Instead, the proposed digital lock 9 may prescribe a date and time for the expiration of the exercise, a designated Participant as the instructor of the exercise, and a potential date, time and target for the transfer.

Exemplary Node

Figure 23:
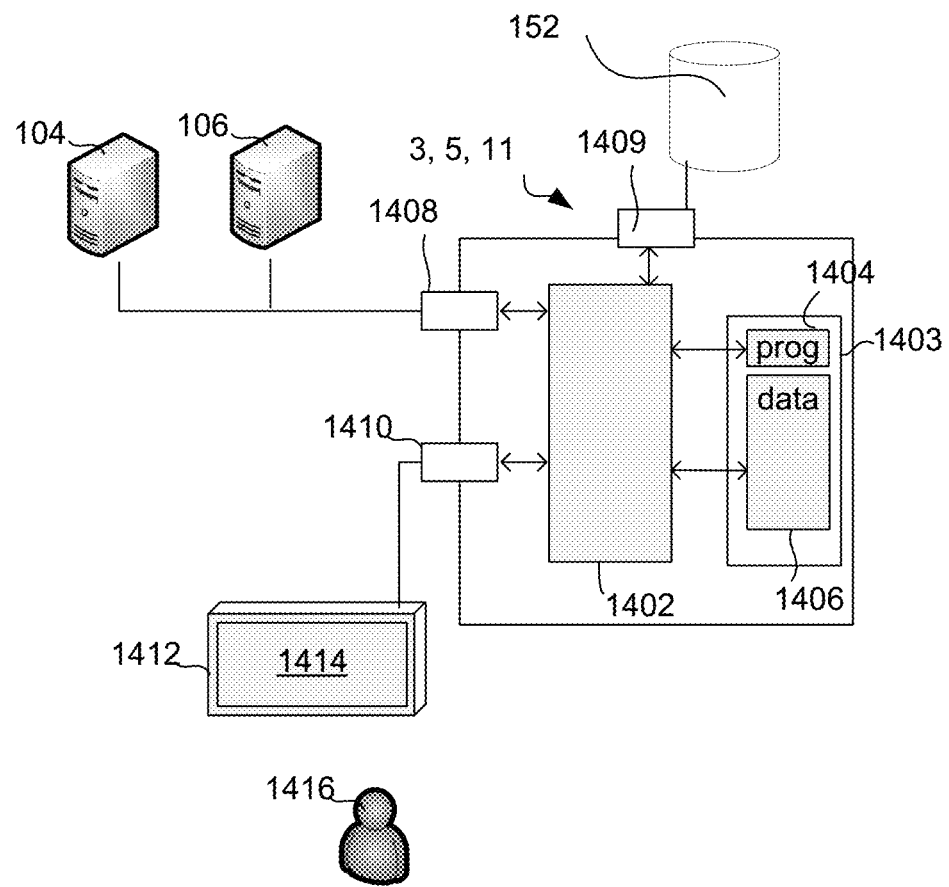
FIG. 23 illustrates an exemplary computer node that may be used in examples of the disclosure.

FIG. 23 illustrates an example computer node 102. The node 102 may be any node in any of the systems disclosed herein, including any of nodes 3, 5, 11. As shown in FIG. 23, the node 102 can include a processor 1402, a memory 1403, a network interface device 1408, a distributed ledger interface device 1409 that interfaces with the distributed ledger 152 and a user interface 1410. The memory can store instructions 1404 and data 1406, and the processor 1402 can perform the instructions from the memory to implement any of the processes described herein.

The embodiments can include computer-executable instructions, such as routines executed by a general or special-purpose data processing device (e.g., a server or client computer). The instructions can be stored in a non-transient manner or distributed on tangible computer-readable media, including magnetically or optically readable computer discs, hard-wired or pre-programmed chips (e.g., EEPROM semiconductor chips), nanotechnology memory, biological memory, or other data storage media.

The data may be provided on any analog or digital network (e.g., packet-switched, circuit switched, or the like). The embodiments can be practiced in distributed computing environment where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. The embodiments can be implemented as software as a service (SaaS) in a cloud computing environment. Those skilled in the relevant art will recognize that portions of the described technology may reside on a server computer, while corresponding portions reside on a client computer (e.g., PC, mobile computer, tablet, or smart phone).

The information described herein can be transmitted and stored as data structures. Various messaging protocols can be used and each transaction can include a transaction message that includes the sender's digital signature, a recipient address (e.g., a hash value based on the receiver's public key). Transaction messages can be digitally signed by the sender's private key to create a digital signature for verifying the sender. The messages can be decrypted using the digital signature via the sender's public key to verify authenticity in a known manner.

The computing devices can include a personal computer, workstation, phone, or tablet, having one or more processors coupled to one or more memories storing computer-readable instructions. The various devices can be communicatively coupled in a known manner as via a network. For example, network hubs, switches, routers, or other hardware network components within the network connection can be used.

In general, the description of embodiments of the software and/or hardware facilities is not intended to be exhaustive or to limit the technology to the precise form disclosed above. While specific embodiments of, and examples for, the technology are described above for illustrative purposes, various equivalent modifications are possible within the scope of the software and/or hardware facilities, as those skilled in the relevant art will recognize. The teachings of the software and/or hardware facilities provided herein can be applied to other systems, not necessarily the system described herein. The elements and acts of the various embodiments described herein can be combined to provide further embodiments.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A system for managing transfer of digital assets with digital locks, recorded on a distributed ledger, between a plurality of participants, the system comprising:
   a processor of a first computer node of a first participant; and
   memory storing program instructions that, when executed by the processor of the first computer node of the first participant, cause the processor to perform the steps of:
     sending a first proposed digital lock including a first inactive digital lock for a transaction of the transfer of a first digital asset from the first participant to a receiving participant, wherein the first digital lock, when activated, can prevent the transfer of the first digital asset from the first participant to another participant that is not the receiving participant, wherein the proposed first digital lock comprises a cryptographic signature of the first participant, the inactive first digital lock, an identifier of the first digital asset, an identifier of the receiving participant, parameters associated with the transfer of the first digital asset, and code segments, wherein the code segments are executable to activate the first digital lock, transfer the first digital asset, and deactivate the first digital lock;
     receiving a second proposed digital lock including a second inactive digital lock for a transaction of the transfer of a second digital asset from a sending participant to the first participant, wherein the second digital lock, when activated, can prevent the transfer of the second digital asset from the sending participant to another participant that is not the first participant, wherein the proposed second digital lock comprises a cryptographic signature of the sending participant, the inactive second digital lock, an identifier of the second digital asset, an identifier of the first participant, parameters associated with the transfer of the second digital asset, and code segments, wherein the code segments are executable to activate the second digital lock, transfer the second digital asset, and deactivate the second digital lock;
     authenticating the received proposed second digital lock using the cryptographic signature of the sending participant, wherein the authenticating further comprises verifying that the received proposed second digital lock includes the inactive second digital lock;
     receiving an acceptance of the proposed first digital lock, wherein the acceptance indicates activation of the proposed first digital lock;
     upon receiving the acceptance of the proposed first digital lock, activating the proposed second digital lock;
     receiving, from a computer node of the sending participant, the second digital asset;
     upon receiving the second digital asset, deactivating the activated second digital lock; and
     in connection with the deactivating the activated second digital lock, transferring the second digital asset to the receiving participant.

2. The system of claim 1, wherein the receiving participant and the sending participant are a same second participant of the plurality of participants.

3. The system of claim 2, wherein the sending the first proposed digital lock to the second participant is to a computer node of the second participant indirectly through a computer node of a third participant, wherein the receiving the second proposed digital lock from the second participant is to the computer node of the second participant indirectly through the computer node of the third participant, and wherein the activating the proposed second digital lock is performed upon receiving the acceptance of the proposed first digital lock from computer nodes of both the second participant and the third participant.

4. The system of claim 1, wherein the receiving participant is a second participant of the plurality of participants, and wherein the sending participant is a different third participant of the plurality of participants.

5. The system of claim 4, wherein the activating the proposed second digital lock is performed by the processor further upon receiving acceptance of a proposed third digital lock from the computer node of a fourth participant.

6. The system of claim 5, wherein the fourth participant is the sending participant, the proposed third digital lock including a third inactive digital lock for a transaction of the transfer of a third digital asset from the receiving participant to the sending participant, wherein the third digital lock, when activated, can prevent the transfer of the third digital asset from the receiving participant to another participant that is not the sending participant, wherein the proposed third digital lock comprises a cryptographic signature of the receiving participant, the inactive third digital lock, an identifier of the third digital asset, an identifier of the sending participant, parameters associated with the transfer of the third digital asset, and code segments, wherein the code segments are executable to activate the third digital lock, transfer the third digital asset, and deactivate the third digital lock.

7. The system of claim 1, wherein the receiving the acceptance of the proposed first digital lock comprises receiving the acceptance from a computer node of the receiving participant.

8. The system of claim 1, wherein the program instructions, when executed by the processor of the first computer node, cause the processor to perform the steps of:
   upon activating the inactive first digital lock, transmitting a first message to the distributed ledger including details of the first and second activated digital locks; and
   upon transferring the second digital asset to the receiving participant, transmitting a second message to the distributed ledger including details of the deactivated second digital lock and completion of the transfer of the second digital asset.

9. The system of claim 8, wherein the receiving the acceptance of the proposed first digital lock comprises receiving a message from the distributed ledger indicating the acceptance.

10. The system of claim 8, wherein the system further comprises a private data store of the first participant, and the program instructions, when executed by the processor of the first computer node, cause the processor to perform the step of storing the received proposed second digital lock in the private data store of the first participant, wherein the private data store is separate from the distributed ledger.

11. The system of claim 8, wherein the recording the activating the inactive second digital lock to the ledger comprises broadcasting the activating the inactive second digital lock to a writer node of the ledger.

12. The system of claim 8, wherein the deactivating the activated digital lock comprises sending a token of deactivation to a writer node of the ledger.

13. The system of claim 1, wherein the code segments of activated first digital lock are executable to deactivate the first digital lock in response to either one of receipt by the receiving participant of the first digital asset or expiration of a predetermined period of time, and wherein the code segments of activated second digital lock are executable to deactivate the second digital lock in response to either one of receipt by the first participant of the second digital asset or expiration of the predetermined period of time.

\* \* \* \* \*